United States Patent
Sekiya

(10) Patent No.: US 11,574,293 B2
(45) Date of Patent: Feb. 7, 2023

(54) INFORMATION PROCESSING APPARATUS AND METHOD, AND INFORMATION PROCESSING SYSTEM

(71) Applicant: SONY CORPORATION, Tokyo (JP)

(72) Inventor: Shuichi Sekiya, Saitama (JP)

(73) Assignee: SONY CORPORATION, Tokyo (JP)

( * ) Notice: Subject to any disclaimer, the term of this patent is extended or adjusted under 35 U.S.C. 154(b) by 432 days.

(21) Appl. No.: 16/076,938

(22) PCT Filed: Feb. 10, 2017

(86) PCT No.: PCT/JP2017/004954
§ 371 (c)(1),
(2) Date: Aug. 9, 2018

(87) PCT Pub. No.: WO2017/145817
PCT Pub. Date: Aug. 31, 2017

(65) Prior Publication Data
US 2019/0050835 A1    Feb. 14, 2019

(30) Foreign Application Priority Data
Feb. 24, 2016    (JP) .............................. JP2016-032719

(51) Int. Cl.
*G06Q 20/20*    (2012.01)
*G06Q 20/06*    (2012.01)
(Continued)

(52) U.S. Cl.
CPC ........... *G06Q 20/202* (2013.01); *G06Q 20/06* (2013.01); *G06Q 20/065* (2013.01); *G06Q 20/20* (2013.01);
(Continued)

(58) Field of Classification Search
CPC combination set(s) only.
See application file for complete search history.

(56) References Cited

U.S. PATENT DOCUMENTS

2003/0018577 A1*  1/2003  Fukushima .......... G06Q 20/381
                                                            705/39
2009/0026256 A1*  1/2009  Kameda ................ G07F 7/0893
                                                            235/379
(Continued)

FOREIGN PATENT DOCUMENTS

CN          101156184 A      4/2008
EP          1881468 A1       1/2008
(Continued)

OTHER PUBLICATIONS

Office Action for JP Patent Application No. 2018-501583, dated Nov. 30, 2021, 03 pages of English Translation and 03 pages of Office Action.
(Continued)

*Primary Examiner* — Peter Ludwig
*Assistant Examiner* — Reva R Moore
(74) *Attorney, Agent, or Firm* — Chip Law Group

(57) ABSTRACT

The present technology relates to an information processing apparatus and method and an information processing system that make it possible to perform more appropriate information provision. Processing relating to settlement of a commercial transaction is performed and log information relating to the settlement is generated, and the generated log information relating to the settlement is supplied to a server, which performs processing relating to provision of the log information relating to the settlement, without the intervention of a commercial transaction processing unit that performs processing relating to the commercial transaction. Further, processing relating to settlement of a commercial transaction is performed by a given method corresponding to a settlement service selected from a plurality of settlement services that can be utilized for the settlement of the commercial transaction and log information relating to the
(Continued)

settlement corresponding to the settlement service is generated.

8 Claims, 13 Drawing Sheets

(51) Int. Cl.
    *G07G 1/12*         (2006.01)
    *G07G 1/00*         (2006.01)
    *G06Q 20/34*      (2012.01)

(52) U.S. Cl.
    CPC ......... *G06Q 20/204* (2013.01); *G06Q 20/209* (2013.01); *G06Q 20/34* (2013.01); *G06Q 20/352* (2013.01); *G07G 1/00* (2013.01); *G07G 1/12* (2013.01)

(56) References Cited

U.S. PATENT DOCUMENTS

| | | | |
|---|---|---|---|
| 2009/0050691 A1* | 2/2009 | Matsumoto | G07F 19/201 235/379 |
| 2010/0036742 A1 | 2/2010 | Ito | |
| 2014/0310117 A1* | 10/2014 | Moshal | G06K 19/06037 705/40 |
| 2015/0242830 A1 | 8/2015 | Masuda | |

FOREIGN PATENT DOCUMENTS

| | | |
|---|---|---|
| EP | 2911104 A1 | 8/2015 |
| JP | 2003-030725 A | 1/2003 |
| JP | 2006-318029 A | 11/2006 |
| JP | 2008-097329 A | 4/2008 |
| JP | 2008-146594 A | 6/2008 |
| JP | 2009-217489 A | 9/2009 |
| JP | 2011-054053 A | 3/2011 |
| JP | 5711848 B2 | 5/2015 |
| JP | 2015-158868 A | 9/2015 |
| TW | 200834475 A | 8/2008 |
| WO | 2006/120892 A1 | 11/2006 |
| WO | 2008/072424 A1 | 6/2008 |

OTHER PUBLICATIONS

International Search Report and Written Opinion of PCT Application No. PCT/JP2017/004954, dated Apr. 18, 2017, 09 pages of English Translation and 08 pages of ISRWO.

International Preliminary Report on Patentability of PCT Application No. PCT/JP2017/004954, dated Sep. 7, 2018, 09 pages of English Translation and 06 pages of IPRP.

\* cited by examiner

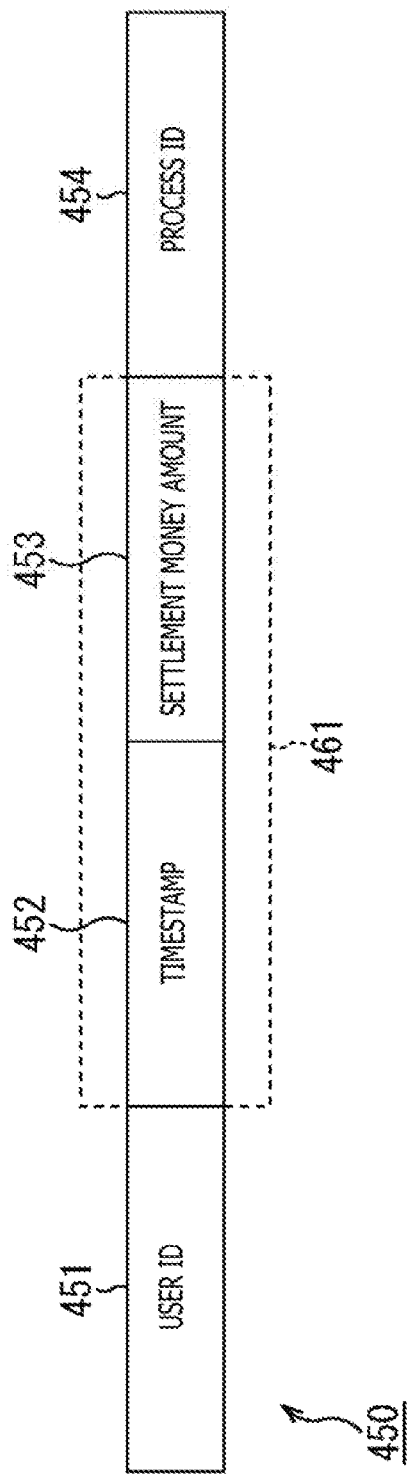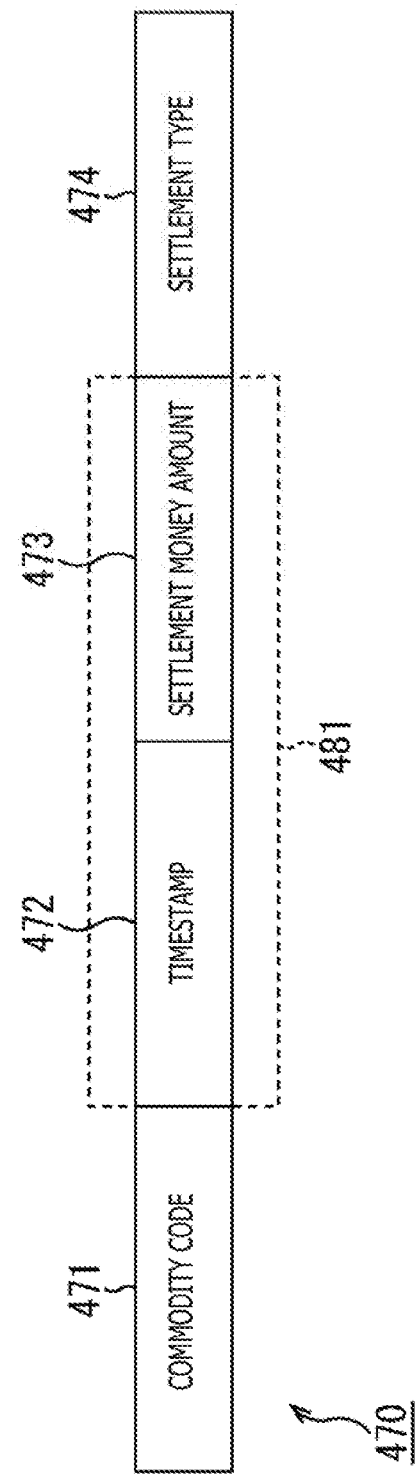
FIG. 12A
FIG. 12B

INFORMATION PROCESSING APPARATUS AND METHOD, AND INFORMATION PROCESSING SYSTEM

CROSS REFERENCE TO RELATED APPLICATIONS

This application is a U.S. National Phase of International Patent Application No. PCT/JP2017/004954 filed on Feb. 10, 2017, which claims priority benefit of Japanese Patent Application No. JP 2016-032719 filed in the Japan Patent Office on Feb. 24, 2016. Each of the above-referenced applications is hereby incorporated herein by reference in its entirety.

TECHNICAL FIELD

The present technology relates to an information processing apparatus and method and an information processing system, and particularly to an information processing apparatus and method and an information processing system by which more suitable information provision can be performed.

BACKGROUND ART

In the past, it has been proposed to collect histories of commodity sales performed by a plurality of vending machines to generate sales management information (for example, refer to PTL 1).

CITATION LIST

Patent Literature

[PTL 1]
JP 2003-30725A

SUMMARY

Technical Problem

However, generally a business operator who sells a commodity and another business operator who provides a settlement service (electronic money or the like) are sometimes different from each other. In the case of a method disclosed in PTL 1, there is the possibility that sorting of information may become difficult in that even information that is not desired to be shared among business operators such as, for example, personal information, commodity information and so forth must be shared or the like.

The present technology has been proposed in view of such a situation as described above and makes it possible to perform more appropriate information provision.

Solution to Problem

An information processing apparatus of one aspect of the present technology is an information processing apparatus including a settlement processing unit configured to perform processing relating to settlement of a commercial transaction to generate log information relating to the settlement, and a log information supplying unit configured to supply the log information relating to the settlement and generated by the settlement processing unit to a server, which performs processing relating to provision of the log information relating to the settlement, without intervention of a commercial transaction processing unit that performs processing relating to the commercial transaction.

The information processing apparatus may be configured such that it further includes a short-range wireless communication unit configured to perform short-range wireless communication with an IC card positioned closely thereto, and that the settlement processing unit is configured to perform exchange of information with the IC card through the short-range wireless communication unit and subtract, as the processing relating to the settlement, an amount of money of the commercial transaction from balance information of the IC card.

The settlement processing unit may be ready for a plurality of settlement services and perform the processing relating to the settlement by a method of a settlement service corresponding to the IC card positioned closely to the short-range wireless communication unit.

The information processing apparatus may further include an information processing unit capable of performing the processing relating to the settlement by a given method corresponding to a settlement service selected from a plurality of settlement services.

The log information relating to the settlement may include a settlement money amount indicative of a settled amount of money and time information indicative of time at which the settlement is performed.

The log information relating to the settlement may further include user identification information for identifying a user of the settlement and settlement identification information for identifying the settlement process.

The information processing apparatus may further include a commercial transaction processing unit configured to perform the processing relating to the commercial transaction.

The log information supplying unit may provide log information relating to the settlement in response to a request of the server that is managed by a business operator different from a business operator that manages the commercial transaction processing unit.

The information processing apparatus may be configured such that it further includes a communication unit configured to perform communication with the server without the intervention of the commercial transaction processing unit, and that the log information supplying unit is configured to supply the log information relating to the settlement to the server through the communication unit.

An information processing method of the one aspect of the present technology is an information processing method including performing processing relating to settlement of a commercial transaction to generate log information relating to the settlement, and supplying the generated log information relating to the settlement to a server, which performs processing relating to provision of the log information relating to the settlement, without intervention of a commercial transaction processing unit that performs processing relating to the commercial transaction.

An information processing apparatus of a different aspect of the present technology is an information processing apparatus including an information processing unit configured to perform processing relating to settlement of a commercial transaction by a given method corresponding to a settlement service selected from a plurality of settlement services that can be utilized for the settlement of the commercial transaction to generate log information relating to the settlement corresponding to the settlement service.

The log information relating to the settlement and generated by the information processing unit may be supplied to a server without intervention of a commercial transaction processing unit that performs processing relating to the commercial transaction.

The log information relating to the settlement and generated by the information processing unit may be supplied in response to a request of the server that is managed by a business operator different from a business operator that manages the commercial transaction processing unit.

The log information relating to the settlement and generated by the information processing unit may be supplied to the server through a communication unit that performs communication with the server without the intervention of the commercial transaction processing unit.

The information processing unit may perform, as the processing relating to the settlement, a process for subtracting an amount of money of the commercial transaction from balance information of an IC card utilized for the settlement by a method corresponding to a selected settlement service.

The log information relating to the settlement may include a settlement money amount indicative of a settled amount of money and time information indicative of time at which the settlement is performed.

The log information relating to the settlement may further include user identification information for identifying a user of the settlement and settlement identification information for identifying the settlement process.

The information processing unit may further perform processing relating to the commercial transaction.

An information processing method of the different aspect of the present technology is an information processing method including performing processing relating to settlement of a commercial transaction by a given method corresponding to a settlement service selected from a plurality of settlement services that can be utilized for the settlement of the commercial transaction to generate log information relating to the settlement corresponding to the settlement service.

An information processing system of a further aspect of the present technology is an information processing system including an information processing apparatus that processes information and a server that exchanges information with the information processing apparatus. The information processing apparatus includes a settlement processing unit configured to perform processing relating to settlement of a commercial transaction to generate log information relating to the settlement, and a log information supplying unit configured to supply the log information relating to the settlement and generated by the settlement processing unit to the server without intervention of a commercial transaction processing unit that performs the processing relating to the commercial transaction. The server includes an acquisition unit configured to acquire the log information relating to the settlement and supplied from the information processing apparatus, and a supplying unit configured to supply part or all of the log information relating to the settlement and acquired by the acquisition unit to a different information processing apparatus that is managed by a business operator different from a business operator that manages the server.

In the information processing apparatus and method of the one aspect of the present technology, processing relating to settlement of a commercial transaction is performed and log information relating to the settlement is generated, and the generated log information relating to the settlement is supplied to a server, which performs processing relating to provision of the log information relating to the settlement, without the intervention of a commercial transaction processing unit that performs processing relating to the commercial transaction.

In the information processing apparatus and method of the different aspect of the present technology, processing relating to settlement of a commercial transaction is performed by a given method corresponding to a settlement service selected from a plurality of settlement services that can be utilized for the settlement of the commercial transaction and log information relating to the settlement corresponding to the settlement service is generated.

In the information processing apparatus of the information processing system of the further aspect of the present technology, processing relating to settlement of a commercial transaction is performed and log information relating to the settlement is generated, and the generated log information relating to the settlement is supplied to the server without the intervention of a commercial transaction processing unit that performs the processing relating to the commercial transaction, and in the server, the log information relating to the settlement and supplied from the information processing apparatus is acquired, and part or all of the acquired log information relating to the settlement is supplied to a different information processing apparatus that is managed by a business operator different from a business operator that manages the server.

Advantageous Effect of Invention

With the present technology, communication can be performed. Further, with the present technology, more appropriate information provision can be performed.

BRIEF DESCRIPTION OF DRAWINGS

FIGS. 12A and 12B are views depicting an example of a main configuration of log information.

DESCRIPTION OF EMBODIMENT

In the following, a mode for carrying out the present disclosure (hereinafter referred to as embodiment) is described. It is to be noted that the description is given in the following order.
1. First Embodiment (Information Processing System)

1. First Embodiment

<Configuration of Information Processing System>

Figure 1:
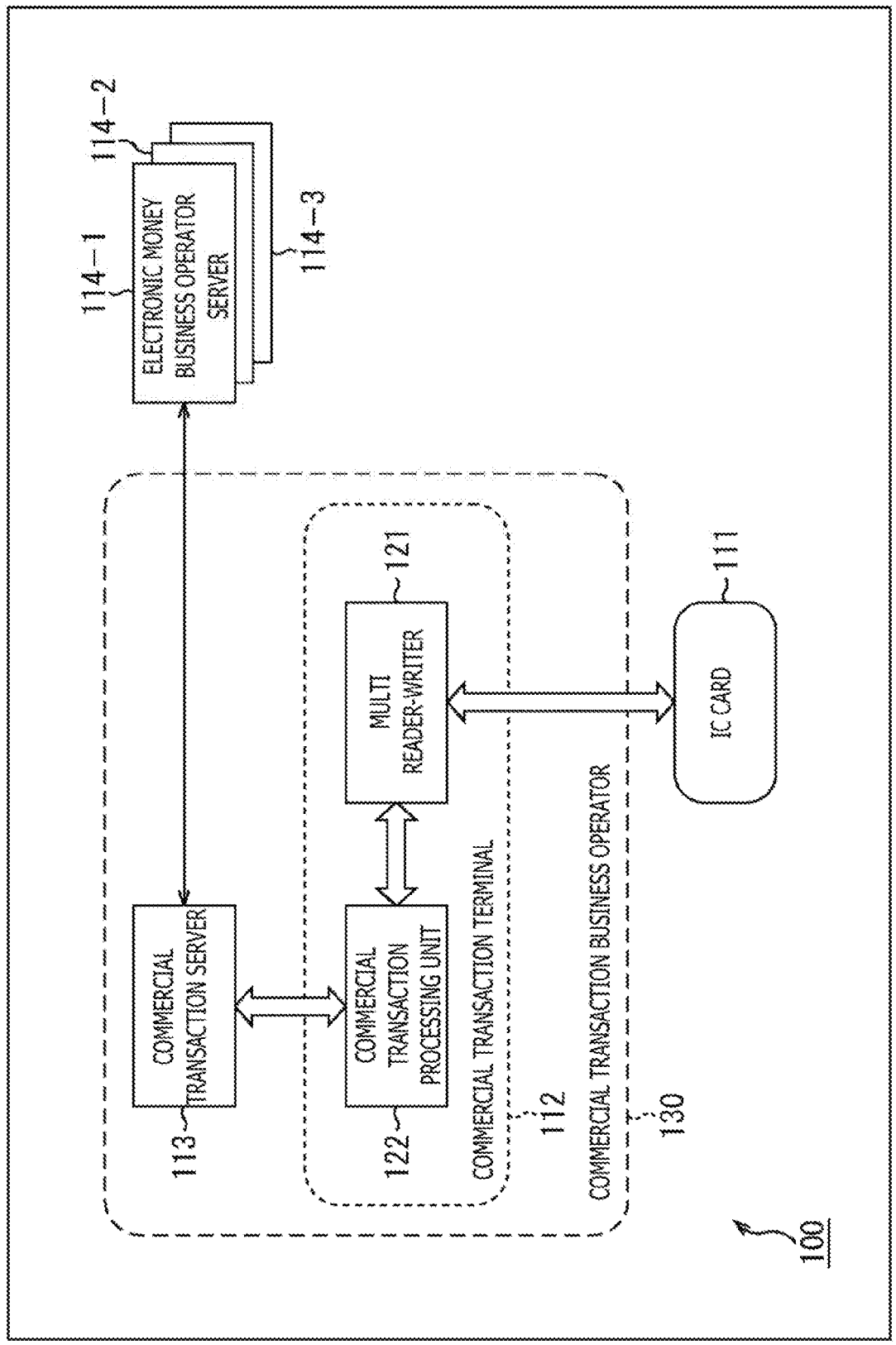
FIG. 1 is a view depicting an example of a main configuration of an information processing system.

FIG. 1 is a view depicting an example of a main configuration of an embodiment of an information processing system. An information processing system 100 depicted in FIG. 1 is a system for performing processing relating to a commercial transaction and settlement on the commercial transaction.

In the information processing system 100, electronic money of a predetermined amount of money is registered in an IC (Integrated Circuit) card 111 a user (not depicted) who performs a commercial transaction has, and the user would perform settlement of a commercial transaction using the electronic money.

Further, in the information processing system 100, a commercial transaction business operator 130 who performs a commercial transaction with the user (who provides a commodity to the user) possesses a commercial transaction terminal 112 and a commercial transaction server 113. The commercial transaction terminal 112 is a terminal apparatus that performs a commercial transaction and is a terminal apparatus of the so-called rich client (Rich Client) type that performs processing relating to a commercial transaction or another process relating to settlement on the commercial transaction. The commercial transaction terminal 112 includes a multi reader-writer 121 and a commercial transaction processing unit 122. The multi reader-writer 121 performs processing relating to settlement on a commercial transaction. The multi reader-writer 121 can perform short-range wireless communication with an IC card 111 positioned closely thereto and can perform processing relating to settlement using electronic money registered in the IC card 111. The commercial transaction processing unit 122 performs processing relating to a commercial transaction such as provision of a commodity to the user (business partner), generation of log information of a commercial transaction and so forth.

The commercial transaction server 113 performs communication with the commercial transaction terminal 112 through an arbitrary network (communication medium) such as the Internet or the like and collects log information (business log information) relating to a commercial transaction performed locally (with commercial transaction terminal 112) from a local apparatus (commercial transaction terminal 112). Further, the commercial transaction server 113 performs processing relating to collected commercial transaction log information such as, for example, a billing process or the like.

The electronic money of the IC card 111 is a settlement service provided by an electronic money business operator (not depicted). In the information processing system 100, the electronic money business operator possesses an electronic money business operator server 114. In an example of FIG. 1, three electronic money business operators participate (can be utilized for settlement) and individually have an electronic money business operator server 114-1, another electronic money business operator server 114-2, and a further electronic money business operator server 114-3.

The electronic money business operator server 114 performs communication with the commercial transaction server 113 through an arbitrary network (communication medium) such as, for example, the Internet or the like and performs processing such as collection of log information relating to settlement in which the electronic money provided by the electronic money business operator is utilized and so forth.

<Flow of Processing Relating to Commercial Transaction and Settlement>

Now, an example of a flow of such processing relating to a commercial transaction and settlement executed in the information processing system 100 as described above is described with reference to a flow chart of FIG. 2.

At step S101, a user (not depicted) of the IC card 111 who is to perform a commercial transaction would select a commodity whose transaction is to be performed and electronic money to be used for settlement of the commercial transaction. After the selection is accepted at step S111, at step S112, the commercial transaction processing unit 122 supplies the selected type of electronic money and information for designating payment for the commodity to the multi reader-writer 121. The multi reader-writer 121 acquires the designation information at step S121.

Further, at step S102, the user would hold the IC card 111 over (closely to) the multi reader-writer 121. After the IC card 111 is held over at step S122, at step S123, the multi reader-writer 121 performs capture of (start of communication with) the IC card 111, authentication of the captured IC card 111, a subtraction process of the balance of electronic money registered in the authenticated IC card and so forth. At step S103, the IC card 111 performs a process corresponding to the process of the multi reader-writer 121 such as provision, updating and so forth of the information registered in the IC card 111 itself.

Further, at step S124, the multi reader-writer 121 performs a business process such as a process relating to settlement and so forth. For example, the multi reader-writer 121 generates log information relating to the settlement by the business process.

Further, in the business process, the multi reader-writer 121 suitably supplies necessary information to the commercial transaction processing unit 122. At step S113, the commercial transaction processing unit 122 acquires the supplied information. Then, at step S114, the commercial transaction processing unit 122 performs a business process such as a process relating to the commercial transaction. After the process necessary for the commercial transaction ends, at step S115, the commercial transaction processing unit 122 provides a commodity to the user. The user receives the commodity at step S104.

As described above, in the case of the information processing system 100 that includes a rich client (commercial transaction terminal 112), processing relating to a commercial transaction or settlement is performed locally.

<Flow of Processing Relating to Provision of Log Information>

Figure 3:
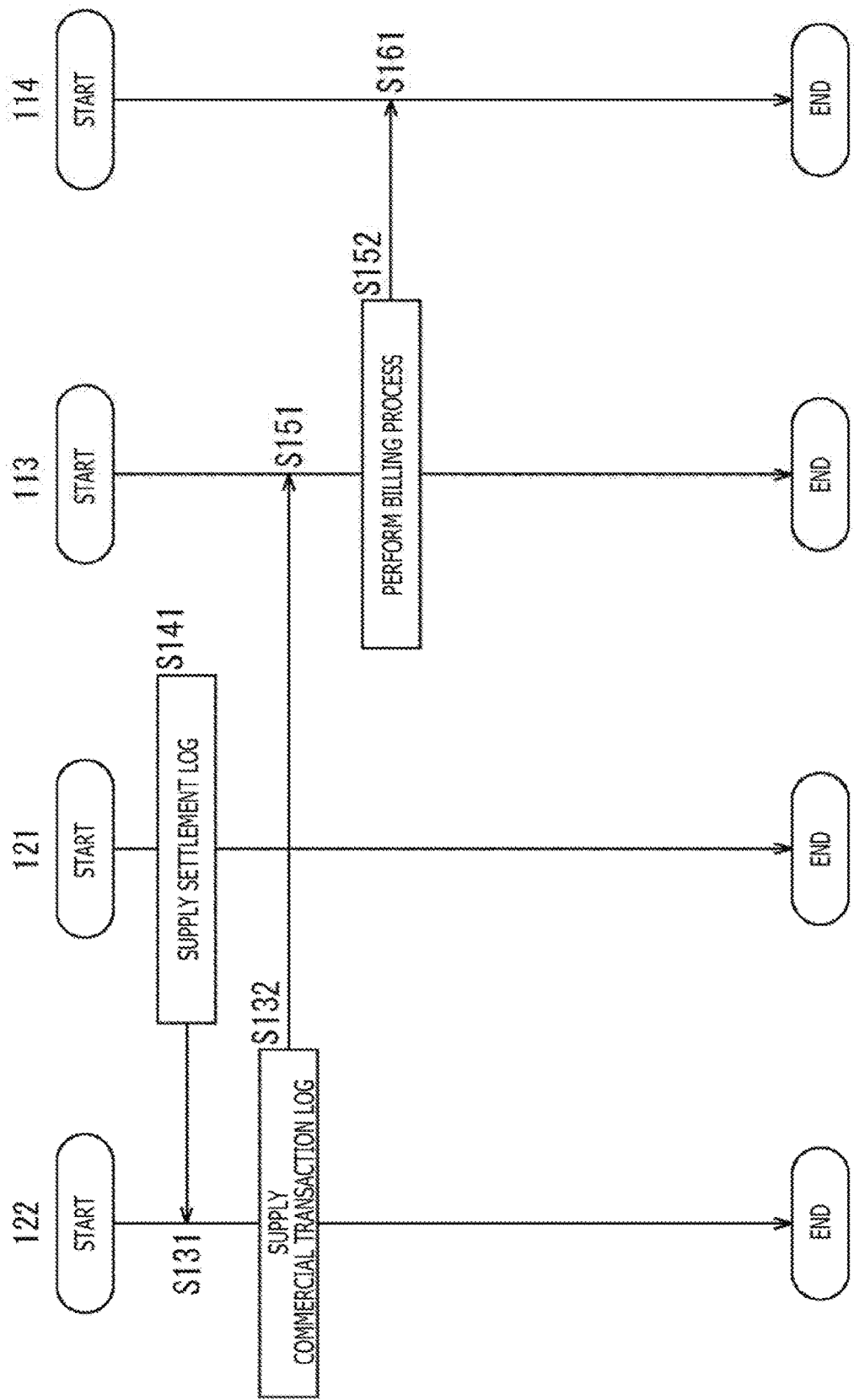
FIG. 3 is a flow chart illustrating an example of a flow of processing relating to provision of log information.

Now, an example of a flow of processing relating to provision of log information of a commercial transaction or settlement executed in the information processing system 100 is described with reference to a flow chart of FIG. 3.

Figure 2:
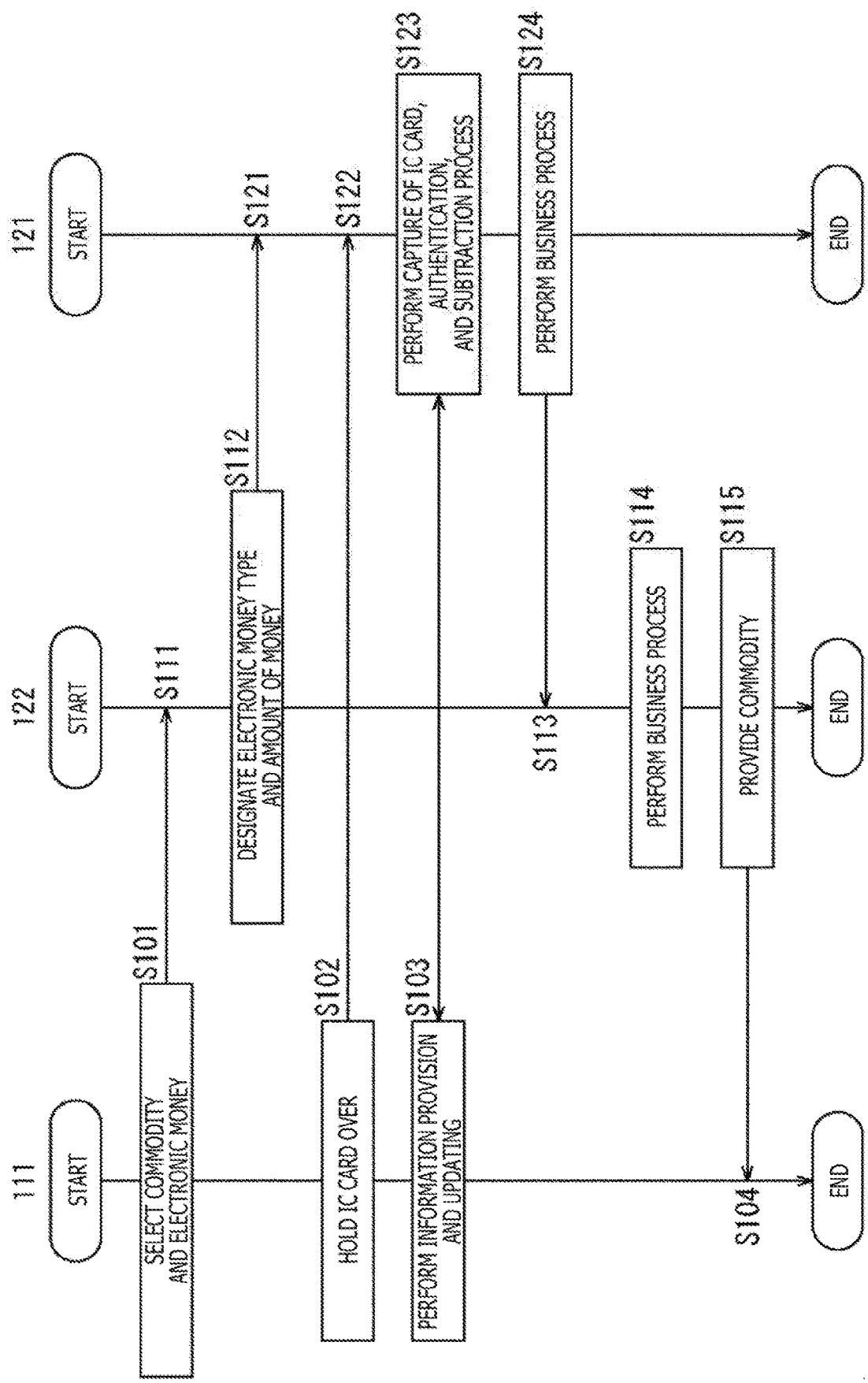
FIG. 2 is a flow chart illustrating an example of a flow of processing relating to a commercial transaction and settlement.

For example, if a commercial transaction is performed as in the flow chart of FIG. 2, then the commercial transaction business operator 130 requests the electronic money business operator for payment for the commodity. In regard to such a request as just described, for example, at step S141, the multi reader-writer 121 supplies a settlement log that is log information of a process relating to settlement to the commercial transaction processing unit 122. The settlement log is generated, for example, in the business process (at step S124 of FIG. 2).

After the settlement log is acquired at step S131, at step S132, the commercial transaction processing unit 122 supplies a commercial transaction log that is log information of the process relating to a commercial transaction corresponding to the settlement log to the commercial transaction server 113 together with the settlement log. The commercial transaction log is generated, for example, in the business process (at step S114 of FIG. 2). Further, the commercial transaction processing unit 122 may supply information of the settlement log that is included in the commercial transaction log.

After the commercial transaction log (including the settlement log) is acquired at step S151, at step S152, the commercial transaction server 113 performs a billing process for requesting the electronic money business operator server 114 of the electronic money business operator who provides the electronic money used in the settlement for payment for the commodity based on the log information.

The electronic money business operator server 114 receives the request at step S161. Then, the electronic money business operator server 114 performs a process such as payment corresponding to the request.

As described above, in the case of the information processing system 100 that includes the rich client (commercial transaction terminal 112), all the commercial transaction logs and settlement logs are managed by a commercial transaction business operator. Information to be managed by the commercial transaction business operator 130 (information possessed by the commercial transaction business operator 130) such as, for example, information related to the transacted commodity and so forth is included in the commercial transaction log. In contrast, information to be managed by the electronic money business operator (information possessed by the electronic money business operator) such as, for example, personal information of a user, information of the IC card 111 and so forth is included in the settlement log.

In short, in the case of the information processing system 100, information the electronic money business operator has must be provided to the commercial transaction business operator 130. Further, for example, key information necessary for processing the balance of the IC card 111, key information necessary for collection of log information and so forth must be provided to the commercial transaction business operator 130.

There is the possibility that such information provision as just described may become unnecessary provision of information of a high added value to the electronic money business operator or increase of the possibility of information leak, and, as a result, there is the possibility that it may become difficult to implement cooperation between the commercial transaction business operator 130 and the electronic money business operator, namely, of the information processing system 100.

<Configuration of Information Processing System>

Figure 4:
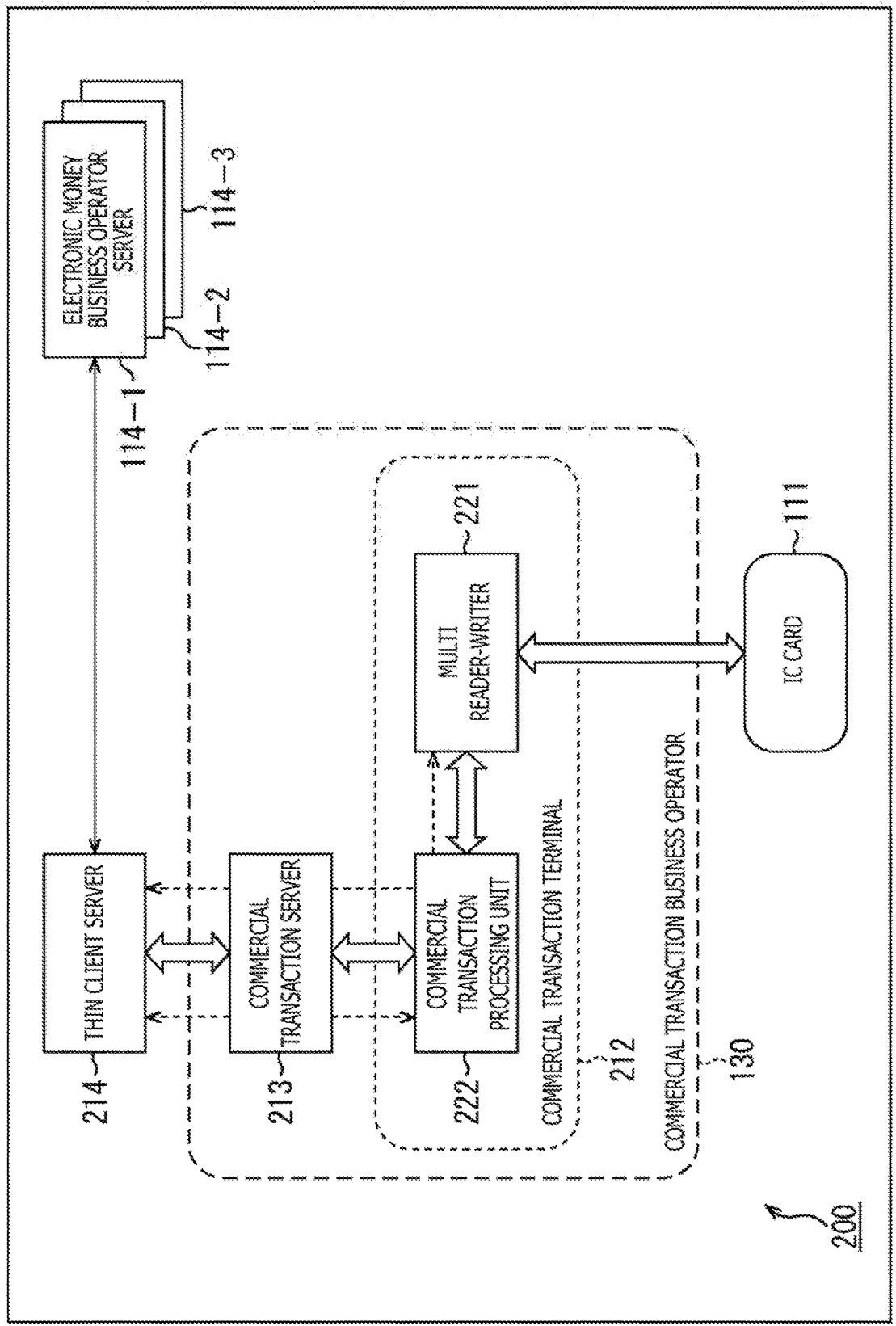
FIG. 4 is a view depicting an example of a main configuration of the information processing system.

FIG. 4 is a view depicting an example of a main configuration of a different form of the information processing system. An information processing system 200 depicted in FIG. 4 is a system basically similar to the information processing system 100 and performs a process relating to a commercial transaction and a process relating to settlement on the commercial transaction.

However, in the case of the information processing system 200, a commercial transaction terminal 212 that is a so-called thin client (Thin Client) type terminal apparatus in place of the commercial transaction terminal 112. Further, a commercial transaction server 213 corresponding to the commercial transaction terminal 212 is used in place of the commercial transaction server 113.

The commercial transaction terminal 212 includes a multi reader-writer 221 and a commercial transaction processing unit 222 as in the commercial transaction terminal 112. The multi reader-writer 221 is a processing unit basically similar to the multi reader-writer 121 and can perform short-range wireless communication with the IC card 111 positioned closely thereto. The commercial transaction processing unit 222 is a processing unit basically similar to the commercial transaction processing unit 122.

Then, in the case of the information processing system 200, a thin client server 214 is used. The thin client server 214 is possessed and managed by an electronic money business operator or an agency of the electronic money business operator. The thin client server 214 performs processing in substitution for the thin client (Thin Client) type commercial transaction terminal 212.

For example, the thin client server 214 controls operation of the multi reader-writer 221 and performs various processes such as a process relating to settlement performed in the multi reader-writer 121 in place of the multi reader-writer 221. Similarly, the thin client server 214 controls operation of the commercial transaction processing unit 222 and performs various processes such as a process relating to a commercial transaction performed in the commercial transaction processing unit 122 in place of the commercial transaction processing unit 222.

<Flow of Processing Relating to Commercial Transaction and Settlement>

Now, an example of a flow of processing relating to a commercial transaction and settlement executed by such an information processing system 200 as described above is described with reference to a flow chart of FIG. 5.

At step S201, a user (not depicted) of the IC card 111 who is to perform a commercial transaction would select a commodity whose commercial transaction is to be performed and electronic money to be used for settlement of the commercial transaction. After the selection is accepted at step S211, at step S212, the commercial transaction processing unit 222 supplies the type of the selected electron money and information for designating payment for the commodity to the thin client server 214 (in place of supplying the information to the multi reader-writer 221). The thin client server 214 acquires the designation information at step S231.

Further, at step S202, the user holds the IC card 111 over (closely to) the multi reader-writer 221. After it is detected by the multi reader-writer 221 that the IC card 111 is held over at step S221, the thin client server 214 detects this at step S232.

At step S233, the thin client server 214 performs capture of the IC card 111 (start of communication), authentication of the captured IC card 111, a subtraction process of the balance of the electronic money registered in the authenticated IC card and so forth. The thin client server 214 controls the multi reader-writer 221 to perform the processes described above in substitution for the multi reader-writer 221 while performing communication with the IC card 111. At step S203, the IC card 111 performs a process corresponding to the process of the multi reader-writer 221 such as provision, updating and so forth of the information registered therein.

Further, at step S234, the thin client server 214 performs a business process such as a process relating to settlement or the like in substitution for the multi reader-writer 221. For example, the thin client server 214 generates log information relating to the settlement by the business process.

At step S235, the thin client server 214 performs a business process such as a process relating to a commercial transaction in substitution for the commercial transaction processing unit 222 or the like. For example, the thin client server 214 generates log information relating to a commercial transaction by the business process. Further, a form may be applied in which the business process such as a process relating to a commercial transaction is performed by the commercial transaction processing unit 222.

At step S236, the thin client server 214 provides the commodity to the user through the commercial transaction processing unit 222. Along with this, the thin client server 214 controls the commercial transaction processing unit 222 as occasion demands to cause the commercial transaction processing unit 222 to operate to provide the commodity. The user would receive the commodity at step S204.

As described above, in the case of the information processing system 200 that includes the thin client (commercial transaction terminal 212), the process relating to a commercial transaction or settlement is performed by the thin client server 214.

<Flow of Processing Relating to Provision of Log Information>

Figure 6:
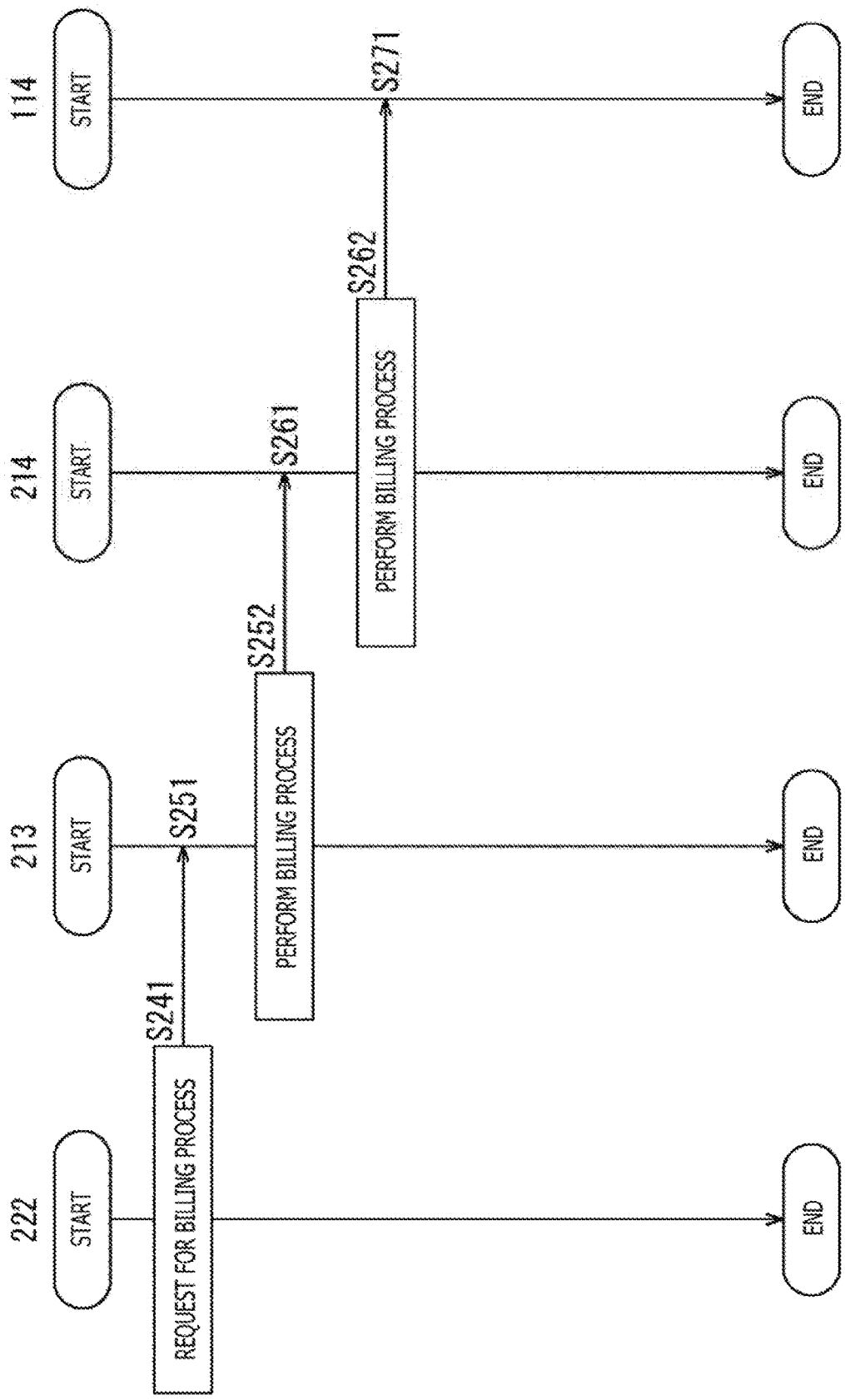
FIG. 6 is a flow chart illustrating an example of a flow of processing relating to provision of log information.

Next, an example of a flow of processing relating to provision of log information of a commercial transaction or settlement executed in the information processing system 200 is described with reference to a flow chart of FIG. 6.

Figure 5:
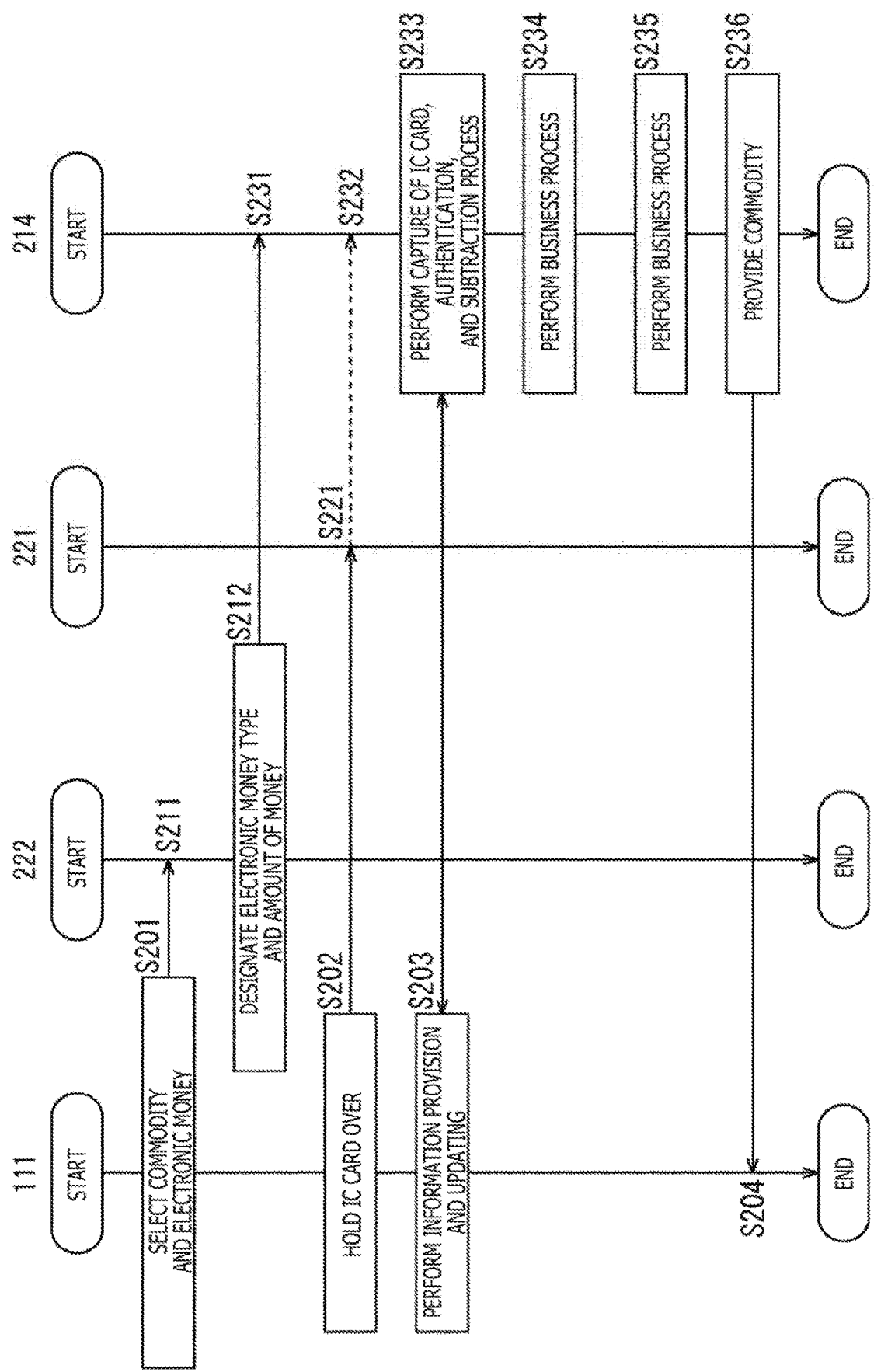
FIG. 5 is a flow chart illustrating an example of a flow of processing relating to a commercial transaction and settlement.

For example, if a commercial transaction is performed as in the flow chart of FIG. 5, then the commercial transaction business operator 130 requests the electronic money business operator for payment for the commodity. In this case, a settlement log and a commercial transaction log are managed in the thin client server 214.

Therefore, at step S241, the commercial transaction processing unit 222 requests the commercial transaction server 213 for a billing process. After the request is accepted at step S251, at step S252, the commercial transaction server 213 requests the thin client server 214 for payment for the commercial transaction. After the request is accepted at step S261, the thin client server 214 performs a billing process for requesting, for payment for the commodity, the electronic money business operator server 114 of an electronic money business operator who provides the electronic money used for the settlement on the basis of the commercial transaction log, settlement log and so forth.

At step S271, the electronic money business operator server 114 receives the request. Then, a process such as payment corresponding to the request is performed.

As described above, in the case of the information processing system 100 that includes the thin client (commercial transaction terminal 212), all the commercial transaction log and the settlement log are managed by the thin client server 214 (namely, by an electronic money business operator or an agency of the business operator). As described above, for example, information to be managed by the commercial transaction business operator 130 (information the commercial transaction business operator 130 possesses) such as information relating to a transacted commodity or the like is included in the commercial transaction log, and the information the commercial transaction business operator 130 has must be provided to the electronic money business operator (or an agency for the same). Further, for example, also key information necessary for collection of log information and so forth must be provided to the electronic money business operator (or an agency for the same).

There is the possibility that such information provision as described above may become unnecessary provision of information of a high added value to the commercial transaction business operator 130 or increase of the possibility of information leak, and, as a result, there is the possibility that it becomes difficult to implement cooperation between the commercial transaction business operator 130 and the electronic money business operator, namely, to implement the information processing system 200.

It is to be noted that, since, in the case of such an information processing system 100 that includes a rich client (commercial transaction terminal 112) as described in the example of FIG. 1, a process relating to a commercial transaction and a process relating to settlement are performed locally as described above, the processes can be performed also offline of the commercial transaction terminal 112 (namely, in a state in which communication with the commercial transaction server 113 or the like cannot be performed).

In contrast, in the case of such an information processing system 200 that includes a thin client (commercial transaction terminal 212) as described in the example of FIG. 4, the commercial transaction terminal 212 cannot perform a process relating to a commercial transaction or a process relating to settlement if it is in a state in which it is communicatable with the thin client server 214 (namely, in an online state).

<Unique Path of Settlement Log>

Therefore, as in the information processing system 100, a process relating to a commercial transaction and a process relating to settlement are performed locally and besides a settlement log is provided to the outside through a unique path. In particular, locally a process relating to settlement for a commercial transaction is performed and log information relating to the settlement is generated and then the generated log information relating to the settlement is supplied to a server that performs processing relating to provision of the log information relating to the settlement without the intervention of a commercial transaction processing unit that performs processing relating to a commercial transaction.

Since the log information relating to a commercial transaction is generated by the commercial transaction processing unit similarly as in the case of the information processing system 100, the log information relating to a commercial transaction is supplied to the commercial transaction server through a path different from that for the log information relating to settlement. Accordingly, since the manager sorts pieces of information different from each other and the different pieces of information can be provided individually to suitable parties, more appropriate information provision can be performed.

<Configuration of Information Processing System>

Figure 7:
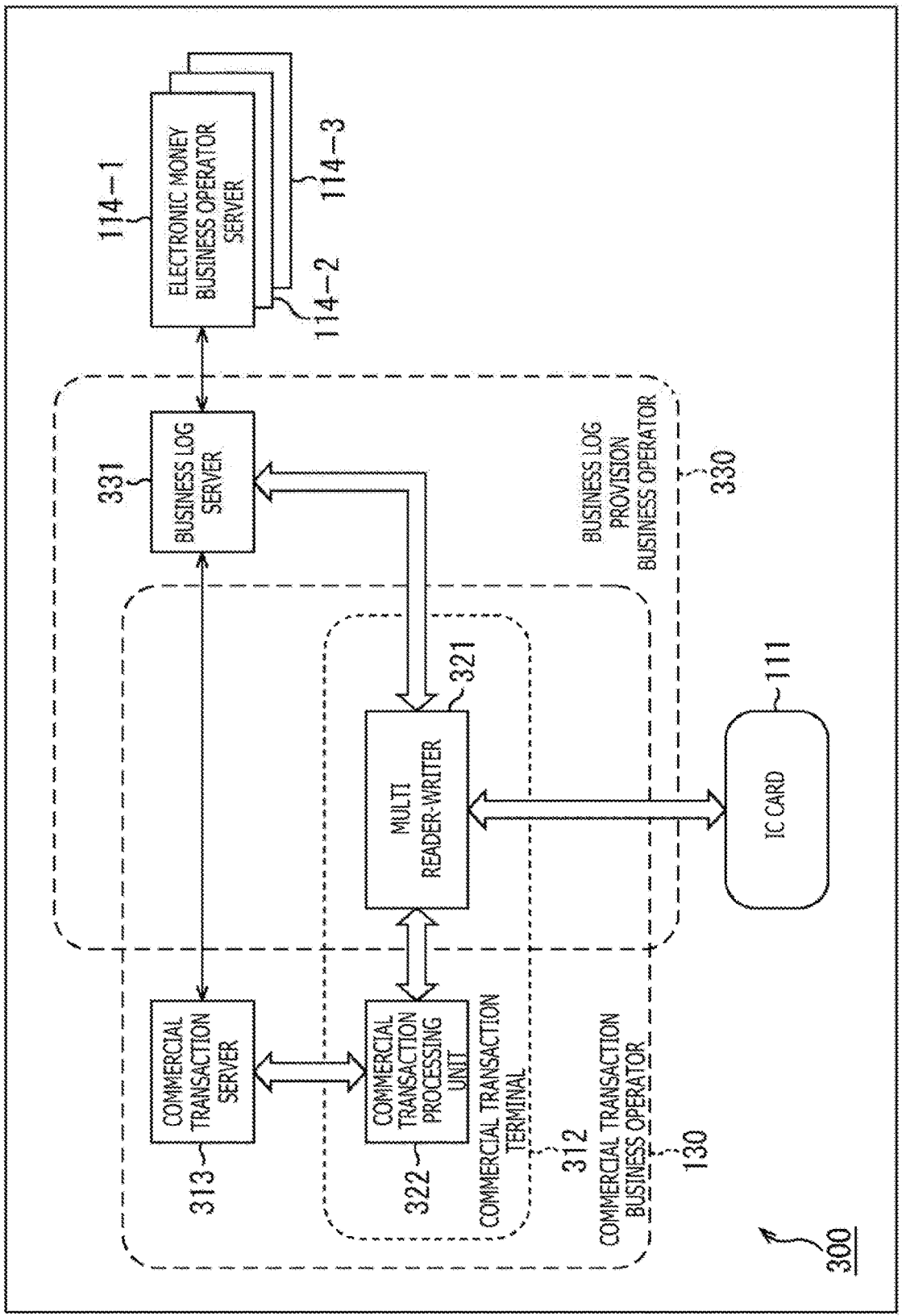
FIG. 7 is a view depicting an example of a main configuration of the information processing system.

FIG. 7 is a view depicting an example of a main configuration of an embodiment of the information processing system to which the present technology is applied. An information processing system 300 depicted in FIG. 7 is a system basically similar to the information processing system 100 or the information processing system 200 described hereinabove and is a system that performs processing relating to a commercial transaction and processing relating to settlement on the commercial transaction.

Here, "commercial transaction" is a transaction of a commodity performed between the user of the IC card 111 and the commercial transaction business operator 130 and may be any transaction such as, for example, sales, rental or the like may be performed. Further, the commodity to be transacted may be any object such as an article, data, a service or the like.

In the information processing system 300, electronic money of a predetermined money amount is registered in the IC card 111 the user (not depicted) who performs a commercial transaction has and the user would perform settlement of the commercial transaction using the electronic money. It is to be noted that, while a single IC card 111 is depicted in FIG. 7, the number of IC cards 111 is arbitrarily. A plurality of users who perform a commercial transaction may exist, or one user may possess a plurality of IC cards 111. Further, the IC card 111 may be compatible with a plurality of types of electronic money (namely, a plurality of settlement services).

In the information processing system 300, the commercial transaction business operator 130 who performs a commercial transaction with the user (who provides commodities to the user) possesses a commercial transaction terminal 312 and a commercial transaction server 313. The commercial transaction terminal 312 is a terminal apparatus that performs a commercial transaction. Although the commercial transaction terminal 312 may be any apparatus, it is carried out, for example, as a terminal apparatus for a POS system (Point of sale system), an automatic vending machine or the like installed in a store. The commercial transaction terminal 312 performs a process relating to a commercial transaction or settlement on the commercial transaction similarly as in the case of the rich client.

The commercial transaction terminal 312 includes a multi reader-writer 321 and a commercial transaction processing unit 322. The multi reader-writer 321 is an information processing apparatus that performs processing relating to settlement on a commercial transaction or a process relating to provision of log information of settlement. The multi reader-writer 321 can perform short-range wireless communication with an IC card 111 positioned closely thereto. The "positioned closely" includes both a state in which the IC card 111 is moved to the proximity of the multi reader-writer 321 (namely, a non-contacting state) and another state in which a housing of the IC card 111 and a housing of the multi reader-writer 321 contact with each other (an electrically non-connected state) (in short, any state is applicable). In short, the IC card 111 is a non-contact type IC card. It is to be noted that the IC card 111 may be configured as a contact type IC card such that, in a state in which external terminals of the multi reader-writer 321 and external terminals of the IC card 111 contact with each other (in an electrically connected state), communication (namely, wired communication) is performed.

By performing such communication, the multi reader-writer 321 can perform, for example, processing relating to settlement using electronic money registered in the IC card 111. The multi reader-writer 321 can be compatible with a plurality of settlement services (electronic moneys). In short, in the information processing system 300, it is possible to utilize a plurality of settlement services (electronic moneys) (in other words, to select a settlement service (electronic money) to be utilized) in a commercial transaction.

The multi reader-writer 321 has an interface for communicating with the commercial transaction processing unit 322 and can exchange information (for example, data, commands, settings and so forth) with the commercial transaction processing unit 322 through the interface.

The commercial transaction processing unit 322 performs processing relating to commercial transactions such as to provide a commodity to a user (business partner), to generate log information of a commercial transaction and so forth. The commercial transaction processing unit 322 can suitably exchange information (for example, data, commands, settings and so forth) with the multi reader-writer 321. Further, the commercial transaction processing unit 322 can suitably perform communication with the commercial transaction server 313 through an arbitrary network (communication medium) such as the Internet or the like to exchange information (for example, data, commands, settings and so forth). For example, the commercial transaction processing unit 322 can supply log information of a commercial transaction (commercial transaction log) to the commercial transaction server 313 through the network.

The commercial transaction server 313 performs communication with the commercial transaction terminal 312 through an arbitrary network (communication medium) such as the Internet or the like to collect log information of commercial transactions (commercial transaction logs) performed locally (with the commercial transaction terminal 312) from a local apparatus (commercial transaction processing unit 322). Further, the commercial transaction server 313 performs processing relating to the collected log information (commercial transaction logs and so forth) such as, for example, a billing process and so forth.

It is to be noted that, while one commercial transaction terminal 312 and one commercial transaction server 313 are depicted in FIG. 7, the numbers of commercial transaction terminals 312 and commercial transaction servers 313 that configure the information processing system 300 are arbitrary (namely, may be plural numbers). Naturally, the numbers of commercial transaction terminals 312 and commercial transaction servers 313 may not be equal to each other.

Incidentally, in the case of the information processing system 300, the multi reader-writer 321 is not a possession only of the commercial transaction business operator 130. The multi reader-writer 321 can execute a program in such a manner as hereinafter described, and the program can be possessed by persons other than the commercial transaction business operator 130 such as an electronic money business operator, a business log provision business operator 330 or the like. In short, also the electronic money business operator and the business log provision business operator 330 can possess the multi reader-writer 321.

The business log provision business operator 330 is a business operator who provides services for providing log information relating to a commercial transaction (business log) and is a business operator different from the commercial transaction business operator 130 or the electronic money business operator. In the information processing system 300, the business log provision business operator 330 possesses the multi reader-writer 321 and a business log server 331.

The multi reader-writer 321 has, in addition to an interface connected to the commercial transaction processing unit 322, a different interface connected to an arbitrary network (communication medium) such as, for example, the Internet or the like. The multi reader-writer 321 can perform communication with the business log server 331 or the like through the interface to exchange information (data, commands, settings and so forth). For example, the multi reader-writer 321 can supply a settlement log that is log information of a process, for example, relating to settlement to the business log server 331 through the interface.

The business log server 331 is a server (information processing apparatus) that performs processing relating to a business log. The business log server 331 is connected to an arbitrary network (communication medium) such as, for example, the Internet or the like and can communicate with a different apparatus through the network. For example, the business log server 331 can collect settlement logs from a local apparatus (multi reader-writer 321) through the network. Further, the business log server 331 can communicate with the commercial transaction server 313 through the network to exchange information (data, commands, settings and so forth). Furthermore, the business log server 331 can perform communication with the electronic money business operator server 114 through the network to exchange information (data, commands, settings and so forth). For example, the business log server 331 provides log information (for example, settlement logs) managed by the business log server 331 itself to the commercial transaction server 313 or the electronic money business operator server 114. Along with this, the business log server 331 appropriately selects and provides information to be provided suitably.

This communication may be wired communication or wireless communication or may be both of them. Further, the network may be a single network or may include a plurality of networks.

It is to be noted that, while a single business log server 331 is depicted in FIG. 7, the number of business log servers 331 configuring the information processing system 300 is arbitrary and may be a plural number. Naturally, the number of business log servers 331 may not be equal to the number of commercial transaction terminals 312 or the number of commercial transaction servers 313.

Electronic money business operator servers 114-1 to 114-3 are servers possessed by electronic money business operators different from one another. In the case where there is no necessity to describe the electronic money business operator servers 114-1 to 114-3 separately from each other, each of them is referred to as electronic money business operator server 114. It is to be noted that, while three electronic money business operator servers 114 are depicted in FIG. 7, the number of electronic money business operator servers 114 configuring the information processing system 300 is arbitrary. Further, in the information processing system 300, the number of electronic money business operators who provide electronic money (settlement service) is arbitrary. Further, one electronic money business operator may have a plurality of electronic money business operator servers 114, or a plurality of electronic money business operators may share a single electronic money business operator server 114.

<Configuration of Multi Reader/Writer>

Figure 8:
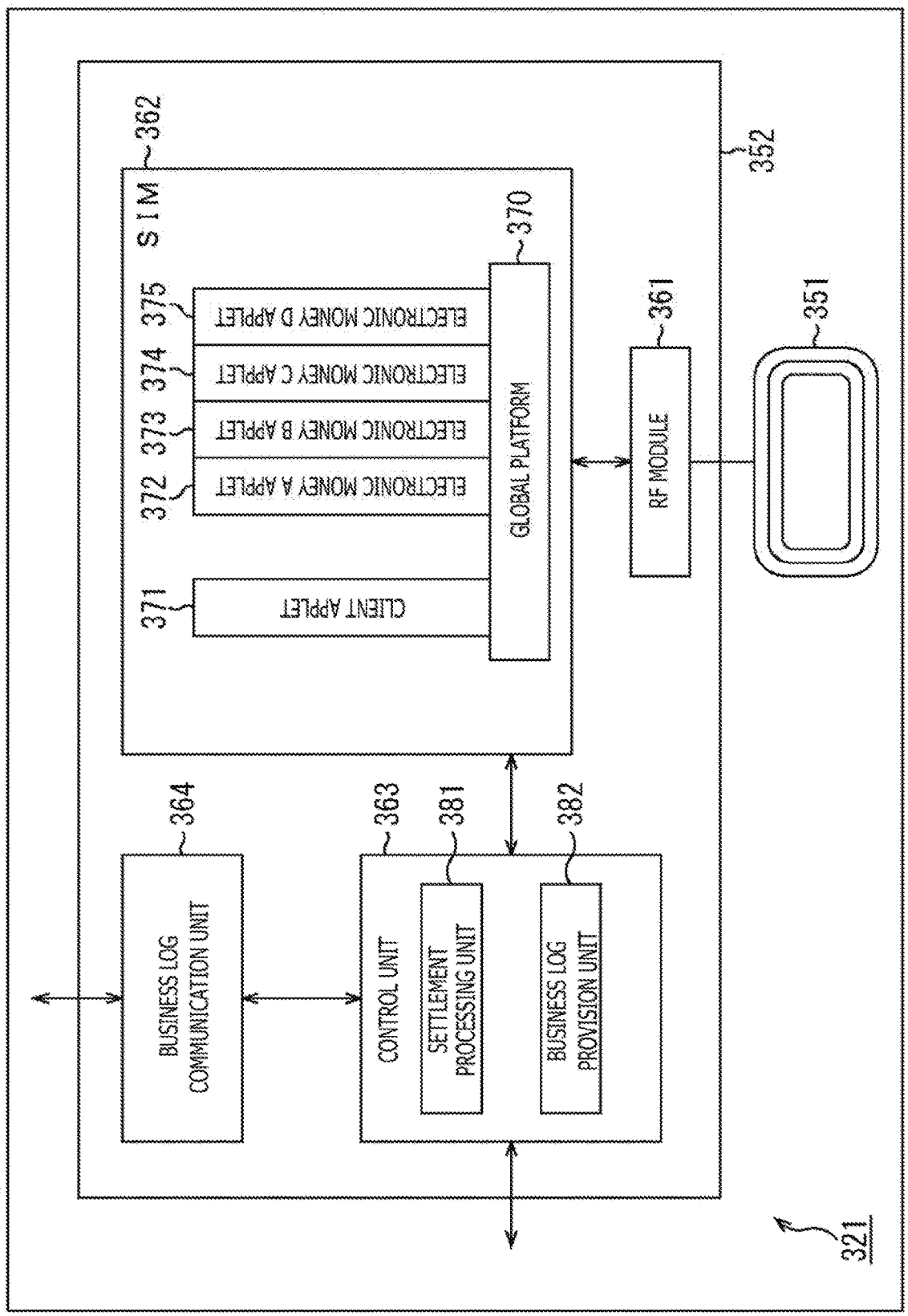
FIG. 8 is a block diagram depicting an example of a main configuration of a multi reader-writer.

FIG. 8 is a block diagram depicting an example of a main configuration of the multi reader-writer 321. As depicted in FIG. 8, the multi reader-writer 321 includes a loop antenna 351 and an information processing unit 352. The loop antenna 351 is an antenna device for short-range wireless communication performed, for example, with the IC card 111. The information processing unit 352 performs a process as a reader/writer. The information processing unit 352 includes an RF (Radio Frequency) module 361, a SIM (Subscriber Identity Module) 362, a control unit 363, and a business log communication unit 364.

The RF module 361 performs processing relating to short-range wireless communication through the loop antenna 351. For example, the RF module 361 acquires information from the SIM 362 and supplies the information to the IC card 111 by short-range wireless communication (writes the information into the IC card 111), or acquires information from the IC card 111 by short-range wireless communication and supplies the information to the SIM 362 (reads out information from the IC card 111).

The SIM 362 is an information processing apparatus that performs a process unique to each service by executing an application under the control of the control unit 363. The SIM 362 can execute an application (applet) for each service (business operator) on a global platform 370. For example, the SIM 362 can execute a client applet 371 that performs a process relating to a commercial transaction, an electronic money A applet 372 that performs a process relating to settlement using electronic money A and so forth, an electronic money B applet 373 that performs a process relating to settlement using electronic money B and so forth, an electronic money C applet 374 that performs a process relating to settlement using electronic money C and so forth, and an electronic money D applet 375 that performs a process relating to settlement using electronic money D on the global platform 370. It is to be noted that applets that can be executed on the global platform 370 by the SIM 362 are not limited to the examples described above and any applet may be applied. For example, the SIM 362 may execute an applet that performs processing relating to communication (provision of a settlement log) with the business log server 331.

The SIM 362 can execute the applets independently of each other. In other words, the SIM 362 can suitably execute only a necessary applet. Accordingly, the SIM 362 can suppress increase of unnecessary processes to suppress increase of the load. Further, since the applets are independently of each other for each service, each business operator and so forth, the SIM 362 can perform processes different from each other among different services, different business operators and so forth. In other words, the substance of a process to be executed by the SIM 362 can set uniquely for each service or each business operator. For example, each service, each business operator or the like can uniquely set a method for a settlement process, the substance of log information to be generated, a supply timing of log information and so forth. Accordingly, the SIM 362 can implement more diverse services and processing. Further, since an applet is independent for each service, for each business operator and so forth, the SIM 362 can generate, utilize, and manage the information for each applet. Accordingly, the SIM 362 can perform a process without providing (publishing) information unique to a service or a business operator such as, for example, a log, electronic money or the like to a different service or a different business operator.

Also it is possible to install such applets as described above. In short, the SIM 362 can perform updating of an applet and installation of a new applet. For example, an applet for performing processing relating to a commercial transaction may be installed into the SIM 362 from the commercial transaction server 313 through the commercial transaction processing unit 322. Further, for example, an applet for performing a process relating to settlement may be installed into the SIM 362 from the business log server 331 without the intervention of the commercial transaction processing unit 322.

Since an applet is independent for each service, for each business operator and so forth, installation of a desired applet can be performed at an arbitrary timing (at a timing different from that of a different applet). Furthermore, also development of an applet can be performed independently for each service, for each business operator and so forth. In this manner, the convenience can be improved.

The SIM 362 can exchange information (data, commands, settings and so forth) with the RF module 361 or the control unit 363 as occasion demands. Further, the SIM 362 may be formed as a card device (SIM card) or the like such that it is removable from the commercial transaction terminal 312 (multi reader-writer 321).

The control unit 363 performs processing relating to control of the processing units in the information processing unit 352. The control unit 363 includes, for example, a settlement processing unit 381 and a business log provision unit 382. The settlement processing unit 381 controls, for example, the SIM 362, the RF module 361 and so forth and controls processing relating to settlement. Further, the business log provision unit 382 controls, for example, the SIM 362, the business log communication unit 364 and so forth to control processing relating to provision of a business log (for example, a settlement log). It is to be noted that the control unit 363 can exchange information (for example, data, commands, settings and so forth) with the SIM 362, the business log communication unit 364 and so forth. Further, the control unit 363 can exchange information (for example, data, commands, settings and so forth) also with the RF module 361. Furthermore, the control unit 363 can exchange information (for example, data, commands, settings and so forth) also with the commercial transaction processing unit 322.

The business log communication unit 364 is an interface to be used for provision of a business log (for example, a settlement log). The business log communication unit 364 is connected to an arbitrary network such as, for example, the Internet and can perform communication with a different apparatus (for example, the business log server 331) through the network. For example, the business log communication unit 364 supplies a business log (for example, a settlement log) supplied from the control unit 363 to the business log server 331 under the control of the control unit 363.

<Business Log Server>

Figure 9:
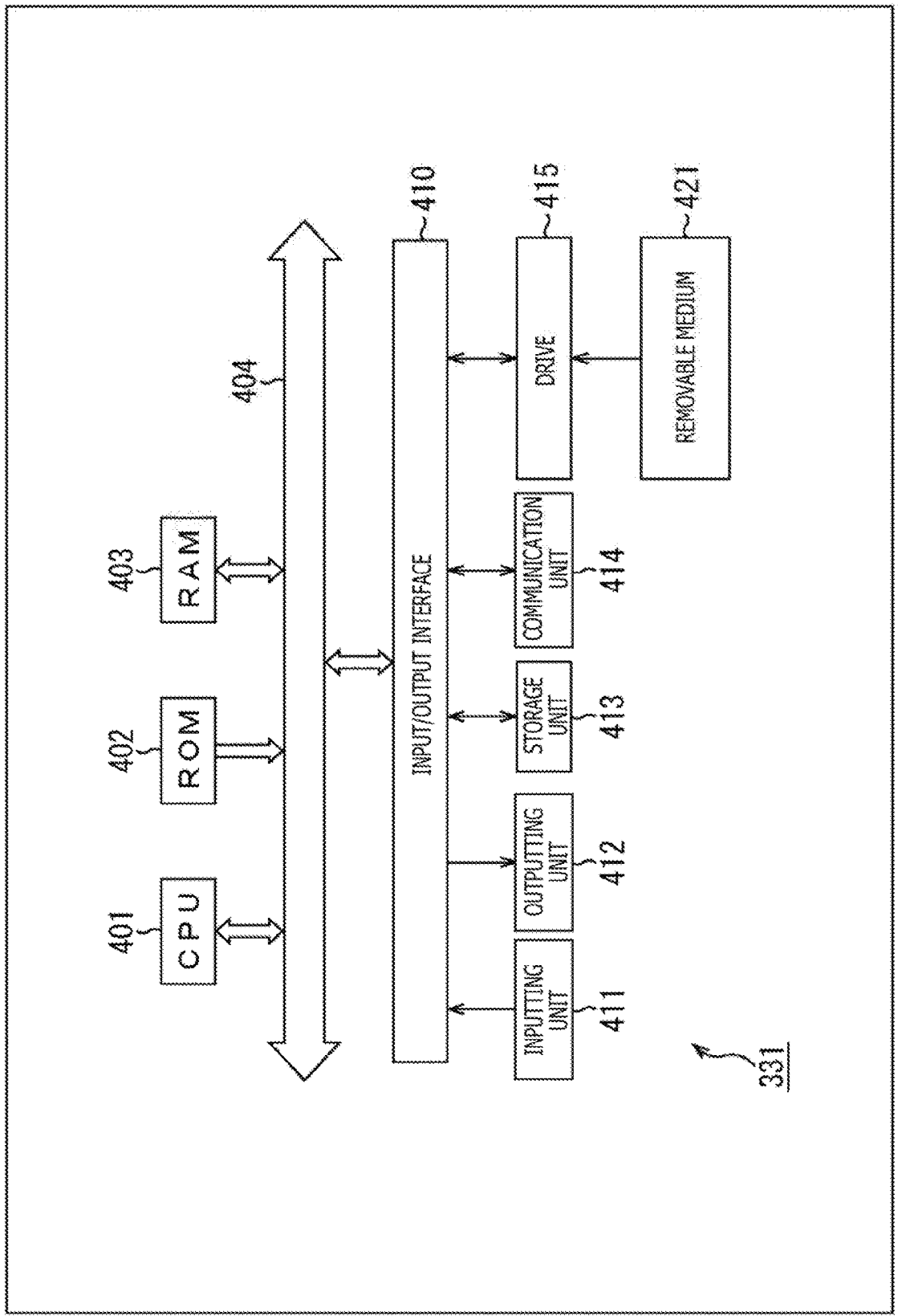
FIG. 9 is a block diagram depicting an example of a main configuration of a business log server.

An example of a main configuration of the business log server 331 is depicted in FIG. 9. As depicted in FIG. 9, the business log server 331 includes a CPU (Central Processing Unit) 401, a ROM (Read Only Memory) 402, a RAM (Radom Access Memory) 403, a bus 404, an input/output interface 410, an inputting unit 411, an outputting unit 412, a storage unit 413, a communication unit 414, and a drive 415.

The CPU 401, the ROM 402, and the RAM 403 are connected to each other by the bus 404. Also the input/output interface 410 is connected to the bus 404. To the input/output interface 410, the components from the inputting unit 411 to the drive 415 are connected.

The inputting unit 411 includes an arbitrary inputting device or devices such as, for example, a keyboard, a mouse, a touch panel, an image sensor, a microphone, a switch, an input terminal and so forth. The outputting unit 412 includes an arbitrary outputting device or devices such as, for example, a display, a speaker, an output terminal and so forth. The storage unit 413 includes an arbitrary storage medium or media such as a nonvolatile memory or memories like, for example, a hard disk, a RAM disk, an SSD (Solid State Drive), or a USB (Universal Serial Bus) memory and so forth. The communication unit 414 has a communication interface of an arbitrary communication standard or standards like a wired or wireless communication standard or both wired and wireless communication standards such as, for example, Ethernet (registered trademark), Bluetooth (registered trademark), USB, HDMI (registered trademark) (High-Definition Multimedia Interface), IrDA and so forth. The drive 415 drives a removable medium 421 having an arbitrary storage medium such as a magnetic disk, an optical disk, a magneto-optical disk, a semiconductor memory or the like.

The CPU 401 loads a program stored, for example, in the ROM 402 or the storage unit 413 into the RAM 403 and executes the program to perform processing. Into the RAM 403, also data and so forth necessary for the CPU 401 to execute various kinds of processes are stored suitably.

<Flow of Processing Relating to Commercial Transaction and Settlement>

In the following, an example of a flow of processing relating to a commercial transaction and settlement executed by the information processing system 300 is described with reference to a flow chart of FIG. 10.

A user (not depicted) of the IC card 111 who is to perform a commercial transaction would select, at step S301, a commodity whose transaction is to be performed and electronic money to be used for settlement of the commercial transaction. When the commercial transaction processing unit 322 accepts such selection at step S311, it supplies the type of the selected electronic money and information that designates payment for the commodity to the multi reader-writer 321 at step S312. The multi reader-writer 321 acquires the destination information at step S321.

Further, the user would hold the IC card 111 over (closely to) the multi reader-writer 321 at step S302. When the IC card 111 is held over the multi reader-writer 321 at step S322, the multi reader-writer 321 performs, at step S323, capture of the IC card 111 (start of communication), authentication of the captured IC card 111, a subtraction process of the balance of the electronic money registered in the authenticated IC card and so forth. For example, the settlement processing unit 381 controls the SIM 362 to execute an applet corresponding to the electronic money registered in the IC card 111 to perform those processes.

The IC card 111 performs processes corresponding to the processes of the multi reader-writer 321 such as provision, updating and so forth of information registered in the IC card 111 itself at step S303.

Further, the multi reader-writer 321 performs a business process that is a process relating to settlement and so froth at step S324. For example, the settlement processing unit 381 controls the SIM 362 to execute an applet corresponding to the electronic money registered in the IC card 111 to perform the business process. For example, the multi reader-writer 121 generates a settlement log by the business process.

After the business process ends, the multi reader-writer 321 notifies the commercial transaction processing unit 322 of the completion of settlement at step S325. Along with this, the multi reader-writer 321 supplies information necessary for the process relating, for example, to the commercial transaction to the commercial transaction processing unit 322.

The commercial transaction processing unit 322 acquires the information at step S313 and performs a business process such as a process relating to the commercial transaction at step S314. For example, the commercial transaction processing unit 322 generates a commercial transaction log and supplies the commercial transaction log to the commercial transaction server 313 so as to be managed. It is to be noted that the supply of the commercial transaction log to the commercial transaction server 313 may be a post process. After the business process ends, the commercial transaction processing unit 322 provides the commodity to the user at step S315. The user would receive the commodity at step S304.

In this manner, in the case of the information processing system 300, a commercial transaction log can be generated by the commercial transaction processing unit 322 and provided to the commercial transaction server 313. In short, the commercial transaction log need not be provided (disclosed) to any other than the commercial transaction business operator 130 and can be managed by the commercial transaction server 313. Accordingly, unnecessary disclosure of information having a high added value to the commercial transaction business operator 130 can be suppressed. Furthermore, for example, in the case where key information or the like necessary for utilization of a commercial transaction log is to be set, also unnecessary disclosure of the key information can be suppressed. Accordingly, also increase the possibility of information leak and so forth can be suppressed and the commercial transaction log can be managed with higher safety.

It is to be noted that, in the case of the information processing system 300, since processes relating to a commercial transaction or processes relating to settlement are performed locally as described hereinabove similarly as in the case of the information processing system 100 of the rich client type, those processes can be performed even in a state in which the commercial transaction terminal 312 is offline (namely, in a state in which the commercial transaction terminal 312 is in a communication disabled state with the commercial transaction server 313, the business log server 331 and so forth). Accordingly, a system of more diverse usage forms (more diverse system configurations) can be implemented. Further, the information processing system 300 may be configured such that the client applet 371 of the multi reader-writer 321 performs a business process such as a process relating to a commercial transaction or the like in place of the commercial transaction unit 322 at step S314. In this case, since the business log server 331 acquires a commercial transaction log from the multi reader-writer 321 and provides the commercial transaction log to the electronic money business operator server 114, the management of the commercial transaction server 313 can be reduced.

<Flow of Processing Relating to Provision of Log Information>

Figure 11:
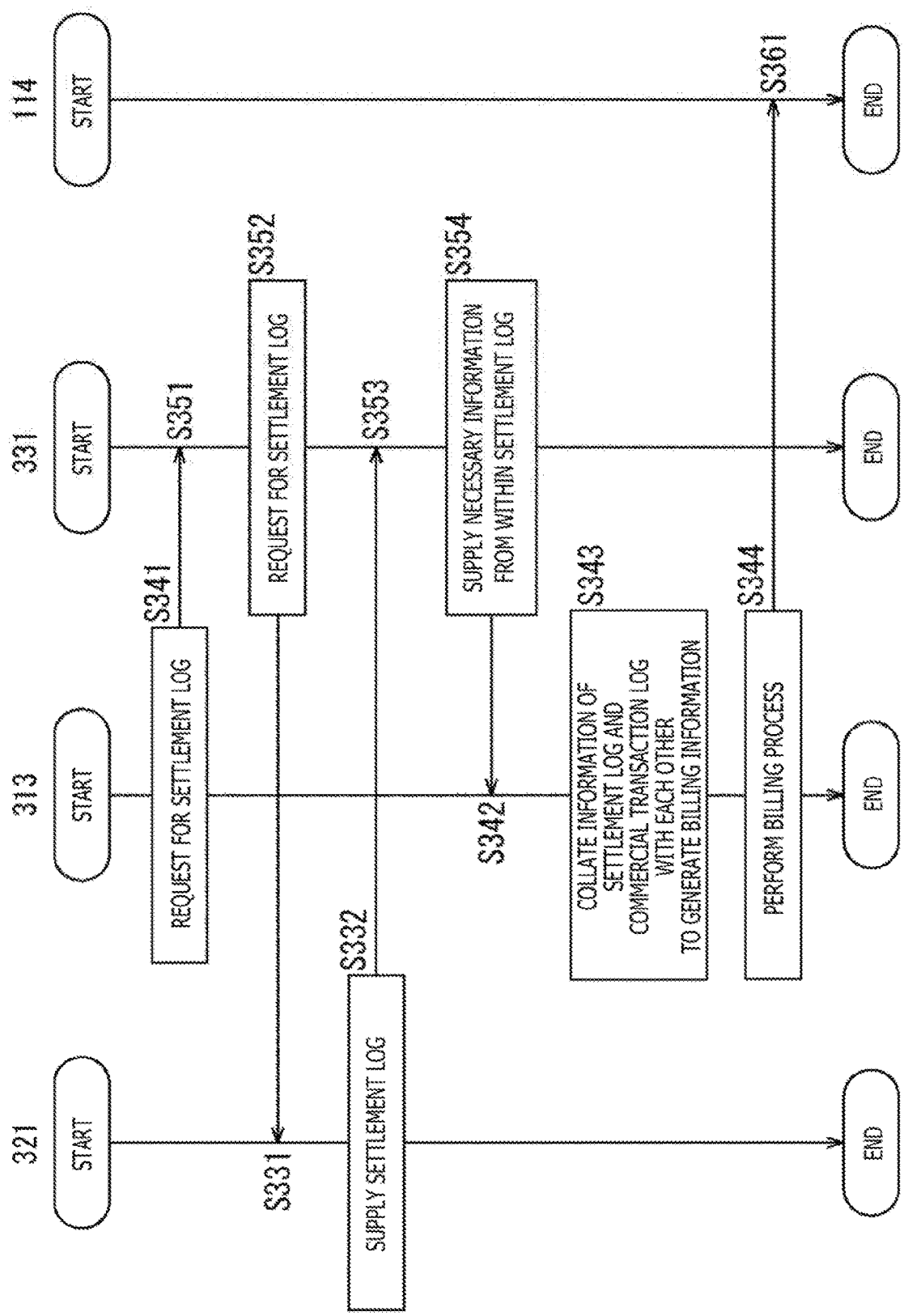
FIG. 11 is a flow chart illustrating an example of a flow of processing relating to provision of log information.

Now, an example of a flow of processing relating to provision of log information of a commercial transaction or settlement executed by the information processing system 300 is described with reference to a flow chart of FIG. 11. In FIG. 11, a process when the commercial transaction server 313 requests the business log server 331 for a settlement log is described.

Figure 10:
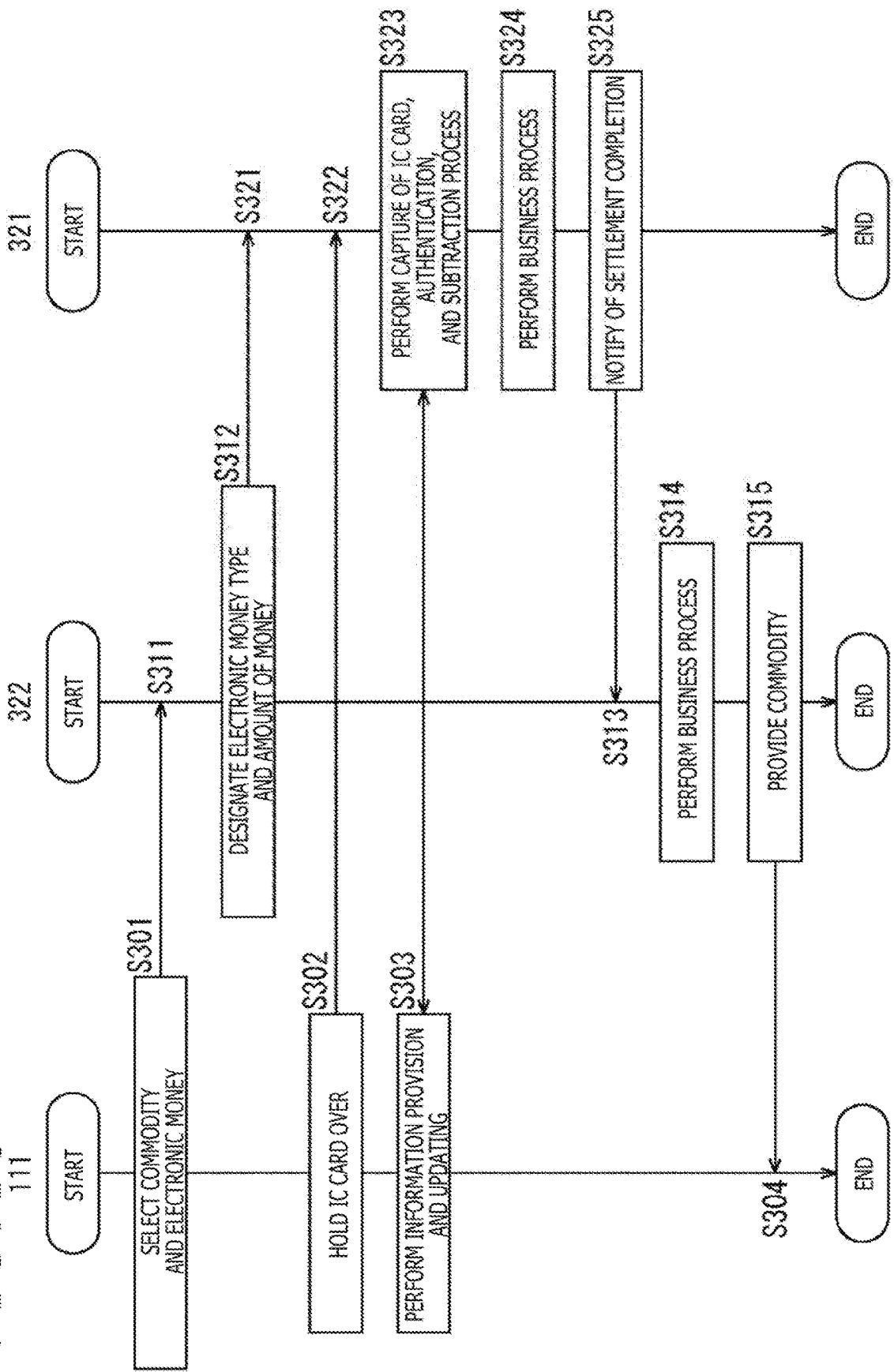
FIG. 10 is a flow chart illustrating an example of a flow of processing relating to a commercial transaction and settlement.

For example, if a commercial transaction is performed as in the flow chart of FIG. 10, then the commercial transaction business operator 130 requests the electronic money business operator for payment for the commodity. In regard to such request, for example, the commercial transaction server 313 requests the business log server 331 for a settlement log corresponding to the commercial transaction log for requesting for payment at step S341. The commercial transaction server 313 performs this request by extracting information necessary to obtain a settlement log corresponding to the commercial transaction log from within the commercial transaction log and supplying the information to the business log server 331.

After the business log server 331 accepts the request at step S351, it requests the multi reader-writer 321 for a settlement log of the request at step S352. The multi reader-writer 321 accepts the request through the business log communication unit 364 at step S331. At step S332, the multi reader-writer 321 supplies the requested settlement log (for example, a settlement log generated by the business process (step S324 of FIG. 10)) to the business log server 331 through the business log communication unit 364.

After the business log server 331 acquires the settlement log at step S353, it extracts necessary information from within the settlement log and supplies the information to the commercial transaction server 313 at step S354.

After the commercial transaction server 313 acquires the information of the settlement log at step S342, it collates the information of the settlement log and the commercial transaction log with each other to generate billing information that is information for requesting for payment at step S343. This billing information may include part or all of information included in the information of the commercial transaction log or the settlement log. The commercial transaction server 313 performs a billing process and supplies the billing information to the electronic money business operator server 114 at step S344.

The electronic money business operator server 114 receives the request at step S361. Then, it performs a process for payment of the money corresponding to the request and so forth.

As described above, in the case of the information processing system 300, the commercial transaction server 313 and the business log server 331 that manage log information exchange only information necessary for each other (information whose disclosure is permitted).

For example, the settlement log has such a configuration as depicted in FIG. 12A. In the case of FIG. 12A, the settlement log 450 has a user ID 451, a timestamp 452, a settlement money amount 453, and a process ID 454. The user ID 451 is identification information of the user (the user of the IC card 111) by whom the settlement is performed (may be identification information of the IC card 111 used for the settlement). The timestamp 452 is information indicative of time at which the settlement is performed. The settlement money amount 453 is information indicative of the settled amount of money (payment for the commodity). The process ID 454 is identification information of the settlement process. This process ID is used for a post process against a mismatch that occurs in such a case that, although, for example, the balance is subtracted from the IC card 111, the IC card 111 is removed before a response to the subtraction is received by the multi reader-writer 321 or in a like case.

Meanwhile, for example, the commercial transaction log has such information as depicted in FIG. 12B. In the case of FIG. 12B, the commercial transaction log 470 has a commodity code 471, a timestamp 472, a settlement money amount 473, and a settlement type 474. The commodity code 471 is identification information indicative of the transacted commodity. The timestamp 472 is information indicative of time at which the settlement is performed. The settlement money amount 473 is information indicative of the settled amount of money (payment for the commodity). The settlement type 474 is information indicative of the type of the settlement service (electronic money) (or the type of the business operator).

As depicted in A of FIG. 12A and FIG. 12B, information surrounded by a broken line 461 of the settlement log 450 (the timestamp 452 and the settlement money amount 453) and information surrounded by a broken line 481 of the commercial transaction log 470 (the timestamp 472 and the settlement money amount 473) are information of the same type. In other words, a timestamp and a settlement money amount are included in both the settlement log 450 and the commercial transaction log 470. Accordingly, the types of information mentioned are information that can be shared by the commercial transaction business operator 130 and the electronic money business operator (disclosable information).

In contrast, the user ID 451 is information unique to the settlement log 450. In short, this information is information that is high in added value to the electronic money business operator and is not desired to be shared by the commercial transaction business operator 130 (information desired not to be disclosed). Further, the commodity code 471 is information unique to the commercial transaction log 470. In short, this information is information that is high in added value to the commercial transaction business operator 130 and is not desired to be shared by the electronic money business operator (information desired not to be disclosed).

Also in such a case as just described, the commercial transaction server 313 and the business log server 331 can exchange only information of a timestamp, a settlement money amount and so forth that can be disclosed to perform the processes described above. Accordingly, unnecessary disclosure of information that is high in added value to the respective business operators can be suppressed. Furthermore, in the case where key information and so forth necessary for utilization of log information (a commercial transaction log or a settlement log) are to be settled, unnecessary disclosure of the key information can be suppressed. Accordingly, also increase of the possibility of information leak and so forth can be suppressed and log information can be managed in more safety.

<Flow of Processing Relating to Provision of Log Information>

Figure 13:
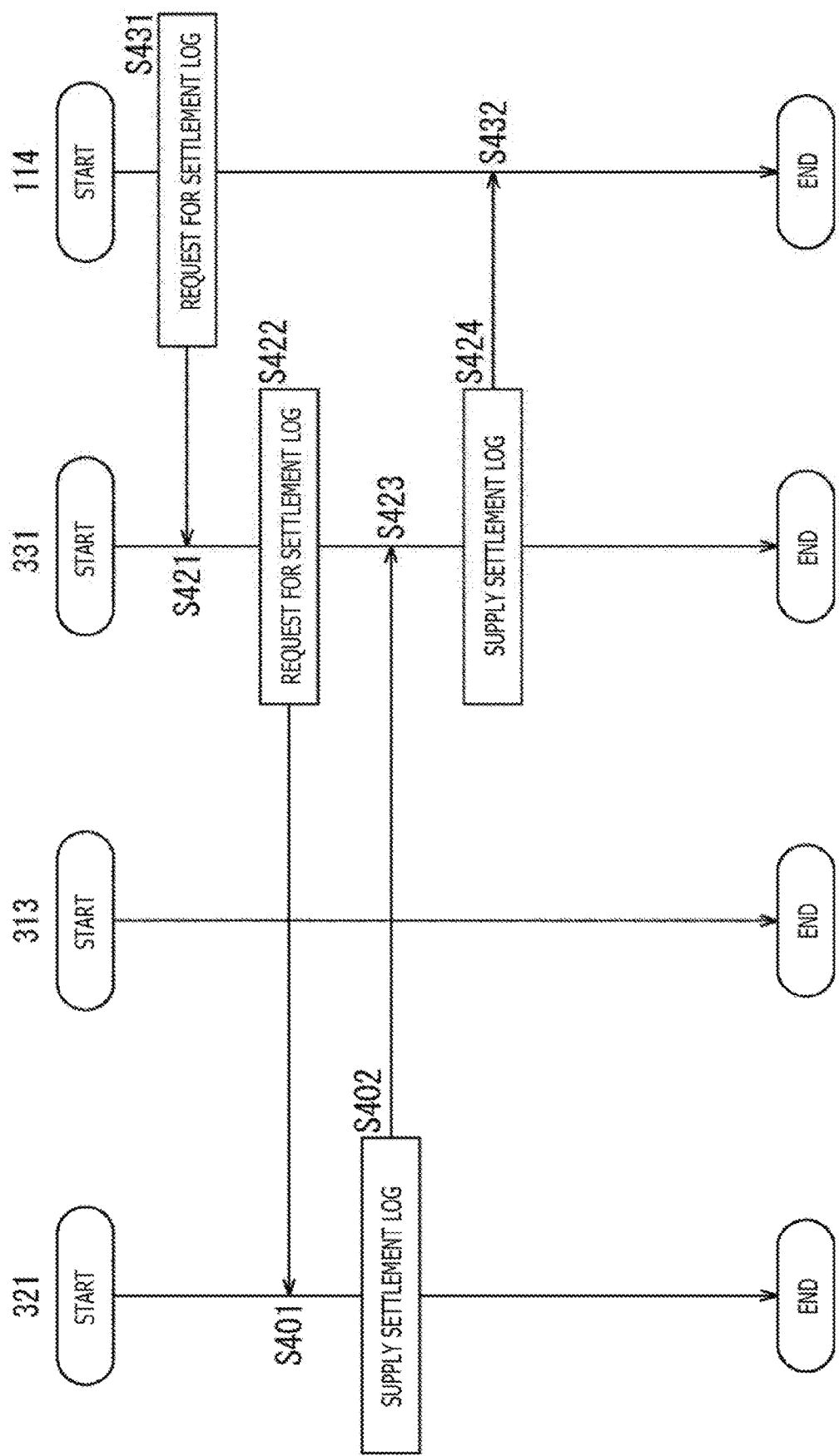
FIG. 13 is a flow chart illustrating an example of a flow of processing relating to provision of log information.

Now, another example of the flow of processing relating to provision of log information for a commercial transaction or settlement, which is executed in the information processing system 300, is described with reference to a flow chart of FIG. 13. In FIG. 13, a process when the electronic money business operator server 114 requests the business log server 331 for a settlement log is described.

For example, the electronic money business operator sometimes utilizes settlement logs as big data such as to take statistics regarding utilization of a settlement service (electronic money) provided by the electronic money business operator itself or the like. For example, for such an object as just described, the electronic money business operator server 114 collects settlement logs.

In this case, the electronic money business operator server 114 requests the business log server 331, which performs a supply service of a settlement log, for a settlement log at step S431.

After the business log server 331 receives the request at step S421, it requests the multi reader-writer 321 corresponding to the request for a settlement log at step S422.

After the business log provision unit 382 of the multi reader-writer 321 receives the request through the business log communication unit 364 at step S401, it controls the SIM 362 to acquire the requested settlement log and supply the settlement log to the business log server 331 through the business log communication unit 364 at step S402.

The business log server 331 acquires the settlement log at step S423 and then supplies the settlement log to the electronic money business operator server 114 at step S424.

The electronic money business operator server 114 acquires the settlement log and performs a process in which the acquired settlement log is used at step S432.

Since the settlement log is information of the electronic money business operator, basically information that should not be disclosed is not included in the settlement log. Accordingly, the business log server 331 provides the settlement log as it is (all information) to the electronic money business operator server 114.

Along with this, since the multi reader-writer 321 can provide the settlement log to the business log server 331 without the intervention of the commercial transaction processing unit 322, the business log server 331 can provide the settlement log to the electronic money business operator that is the requesting source without disclosing the settlement log to other business operators.

As depicted in FIGS. 11 and 13, the business log server 331 can select and provide appropriate information such that unnecessary disclosure of information having a high added value to the respective business operators is suppressed. Further, for example, in the case where key information or the like necessary for utilization of log information (a commercial transaction log or a settlement log) is set, also unnecessary disclosure of the key information can be suppressed. Accordingly, the business log server 331 (information processing system 300) can perform more appropriate information provision in accordance with the party who provides the information.

It is to be noted that, in the case of the information processing system 300, the business log provision business operator 330 manages the settlement log that is information of the electronic money business operator. In the case where the settlement log is not desired to be disclosed to the business log provision business operator 330, the multi reader-writer 321 may encrypt the settlement log using key information or the like. If this encryption is performed by an applet provided by the electronic money business operator and executed by the SIM 362, then the settlement log can be encrypted without disclosing the settlement log to the business log provision business operator 330. It is to be noted that also the key information to be used for encryption can be hidden from the business log provision business operator 330 by filling the key information into the applet.

In this case, the business log server 331 manages the settlement log in the encrypted state. In this case, since it becomes impossible for the business log server 331 to extract part of information from the settlement log and provide the part of information to the commercial transaction server 313, the multi reader-writer 321 may encrypt the settlement log and generate information to be provided to the commercial transaction server 313 (information that can be disclosed) and then provide the information to the business log server 331 together with the encrypted settlement log.

It is to be noted that the difference of the business log provision business operator 330 from an agency of the electronic money business operator that manages the thin client server 214 of FIG. 4 is that a commercial transaction log that is information of a commercial transaction business operator is not basically disclosed (except part of the information that can be disclosed) to the business log provision business operator 330. In short, in the information processing system 300, not only in regard to a settlement log but also in regard to a commercial transaction log, more appropriate information provision can be performed in response to the party to which the information is to be provided.

It is to be noted that the business log provision business operator 330 may be a business operator same as the electronic money business operator.

<Others>

Although the foregoing description is given using electronic money as an example of a settlement service used for settlement of a commercial transaction, the settlement service may be any service if it allows settlement of a commercial transaction to be performed using electronic information. For example, the settlement service may be a post payment settlement service like a credit card or settlement not by cash but by points or the like.

<Computer>

While the series of processes described above can be executed by hardware, it may otherwise be executed by software. In the case where the series of processes is executed by software, for example, the multi reader-writer 321 (the RF module 361, the SIM 362, the control unit 363, the business log communication unit 364 and so forth), the commercial transaction processing unit 322, the commercial transaction server 313, the business log server 331, the electronic money business operator server 114 or the like may have a configuration as a computer that can execute the software. This computer includes, for example, a computer incorporated in hardware for exclusive use, a computer for universal use that can execute an arbitrary function by installing various programs, and so forth.

For example, the business log server 331 has such a configuration as described hereinabove with reference to FIG. 9 such that the CPU 401 loads a program stored, for example, in the storage unit 413 into the RAM 403 through the input/output interface 410 and the bus 404 as described hereinabove to cause the series of processes described hereinabove to be executed by the software.

This program can be recorded into and provided as the removable medium 421, for example, as a package medium or the like. In this case, the program can be installed into the storage unit 413 through the input/output interface 410 by mounting the removable medium 421 on the drive 415.

Further, this program can be provided through a wired or wireless transmission medium such as a local area network, the Internet, or a digital satellite broadcast. In this case, the program can be received by the communication unit 414 and installed into the storage unit 413.

Also it is possible to install the program in advance into the ROM 402 or the storage unit 413.

Although the foregoing description is given of the business log server 331, this similarly applies also to the other apparatus such that the apparatus may have a configuration like that of the business log server 331 (FIG. 9) and execute the program in such a manner as described above.

It is to be noted that the series of processes described above can be executed partly by hardware while the other part is executed by software.

<Others>

The embodiment of the present technology is not limited to the embodiment described hereinabove and various alterations are possible without departing from the subject matter of the present technology.

Further, for example, the present technology can be carried out as any configuration that configures an apparatus or a system, for example, as a processor as a system LSI (Large Scale Integration) or the like, a module for which a plurality of processors or the like are used, a unit for which a plurality of modules or the like are used, a set in which other functions are added to a unit (namely, configuration of part of an apparatus) or the like.

It is to be noted that, in the present specification, the term system signifies a set of a plurality of components (apparatus, modules (parts) and so forth) and it does not matter whether or not all components are provided in the same housing. Accordingly, both a plurality of apparatuses accommodated in separate housings and connected to each other through a network and one apparatus in which a plurality of modules are accommodated in one housing configure a system.

Further, for example, a component described as one apparatus (or processing unit) may be divided so as to configure it as a plurality of apparatuses (or processing units). Conversely, components described as a plurality of apparatuses (or processing units) in the foregoing description may be combined into one apparatus (or processing unit). Further, a component other than the components of each apparatus (or each processing unit) described above may be added to the components. Furthermore, if the configuration or operation of the entire system is substantially same, then some of configurations of a certain apparatus (or processing unit) may be included in the configuration of a different apparatus (or different processing unit).

Further, for example, the present technology can take a configuration for a cloud computer in which one function is shared and cooperatively processed by a plurality of apparatuses through a network.

Further, for example, the program described above can be executed by an arbitrary apparatus. In this case, the apparatus may have necessary functions (functional blocks and so forth) such that it can acquire necessary information.

Further, for example, it is possible to execute each step in the flow charts described hereinabove by one apparatus or execute each step in sharing by a plurality of apparatuses. Furthermore, in the case where a plurality of processes are included in one step, the plurality of processes included in the one step not only can be executed by one apparatus but also can be executed in sharing by a plurality of apparatuses.

It is to be noted that, in regard to a program to be executed by the computer, processes at steps describing the program may be executed in a chronological order in accordance with the sequence described in the present specification or may be executed in parallel or individually at necessary timings such as when the program is called or in a like case. In other words, the processes at the steps may be executed in an order different from the order described above unless inconsistency occurs. Furthermore, the processes at the steps describing the program may be executed in parallel to processes of a different program or may be executed in combination with processes of a different program.

It is to be noted that it is possible to carry out each of the plurality of present technologies described in the present specification independently and solely unless inconsistency occurs. Naturally, also it is possible to carry out arbitrary ones of the plurality of present technologies in combination. For example, also it is possible to carry out the present technology described in connection with one of the embodiments in combination with the present technology described in connection with a different one of the embodiments. Also it is possible to carry out an arbitrary one of the present technologies described above in combination with a different technology that is not described herein.

It is to be noted that the present technology can have such configurations as described below as well.

(1)

An information processing apparatus including:

a settlement processing unit configured to perform processing relating to settlement of a commercial transaction to generate log information relating to the settlement; and a log information supplying unit configured to supply the log information relating to the settlement and generated by the settlement processing unit to a server, which performs processing relating to provision of the log information relating to the settlement, without intervention of a commercial transaction processing unit that performs processing relating to the commercial transaction.

(2)

The information processing apparatus according to (1), further including:

a short-range wireless communication unit configured to perform short-range wireless communication with an IC card positioned closely thereto, in which the settlement processing unit is configured to perform exchange of information with the IC card through the short-range wireless communication unit and subtract, as the processing relating to the settlement, an amount of money of the commercial transaction from balance information of the IC card.

(3)

The information processing apparatus according to (1) or (2), in which the settlement processing unit is ready for a plurality of settlement services and performs the processing relating to the settlement by a method of a settlement service corresponding to the IC card positioned closely to the short-range wireless communication unit.

(4)

The information processing apparatus according to any one of (1) to (3), further including:

an information processing unit capable of performing the processing relating to the settlement by a given method corresponding to a settlement service selected from a plurality of settlement services.

(5)

The information processing apparatus according to any one of (1) to (4), in which the log information relating to the settlement includes a settlement money amount indicative of a settled amount of money and time information indicative of time at which the settlement is performed.

(6)

The information processing apparatus according to any one of (1) to (5), in which the log information relating to the settlement further includes user identification information for identifying a user of the settlement and settlement identification information for identifying the settlement process.

(7)

The information processing apparatus according to any one of (1) to (6), further including:

a commercial transaction processing unit configured to perform the processing relating to the commercial transaction.

(8)

The information processing apparatus according to any one of (1) to (7), in which the log information supplying unit provides log information relating to the settlement in response to a request of the server that is managed by a business operator different from a business operator that manages the commercial transaction processing unit.

(9)

The information processing apparatus according to any one of (1) to (8), further including:

a communication unit configured to perform communication with the server without the intervention of the commercial transaction processing unit, in which the log information supplying unit is configured to supply the log information relating to the settlement to the server through the communication unit.

(10)

An information processing method including:

performing processing relating to settlement of a commercial transaction to generate log information relating to the settlement; and supplying the generated log information relating to the settlement to a server, which performs processing relating to provision of the log information relating to the settlement, without intervention of a commercial transaction processing unit that performs processing relating to the commercial transaction.

(11)

An information processing apparatus including:

an information processing unit configured to perform processing relating to settlement of a commercial transaction by a given method corresponding to a settlement service selected from a plurality of settlement services that can be utilized for the settlement of the commercial transaction to generate log information relating to the settlement corresponding to the settlement service.

(12)

The information processing apparatus according to (11), in which the log information relating to the settlement and generated by the information processing unit is supplied to a server without intervention of a commercial transaction processing unit that performs processing relating to the commercial transaction.

(13)

The information processing apparatus according to (11) or (12), in which the log information relating to the settlement and generated by the information processing unit is supplied in response to a request of the server that is managed by a business operator different from a business operator that manages the commercial transaction processing unit.

(14)

The information processing apparatus according to any one of (11) to (13), in which the log information relating to the settlement and generated by the information processing unit is supplied to the server through a communication unit that performs communication with the server without the intervention of the commercial transaction processing unit.

(15)

The information processing apparatus according to any one of (11) to (14), in which the information processing unit performs, as the processing relating to the settlement, a process for subtracting an amount of money of the commercial transaction from balance information of an IC card utilized for the settlement by a method corresponding to a selected settlement service.

(16)

The information processing apparatus according to any one of (11) to (15), in which the log information relating to the settlement includes a settlement money amount indicative of a settled amount of money and time information indicative of time at which the settlement is performed.

(17)

The information processing apparatus according to any one of (11) to (16), in which the log information relating to the settlement further includes user identification information for identifying a user of the settlement and settlement identification information for identifying the settlement process.

(18)

The information processing apparatus according to any one of (11) to (17), in which the information processing unit further performs processing relating to the commercial transaction.

(19)

An information processing method including:

performing processing relating to settlement of a commercial transaction by a given method corresponding to a settlement service selected from a plurality of settlement services that can be utilized for the settlement of the commercial transaction to generate log information relating to the settlement corresponding to the settlement service.

(20)

An information processing system including an information processing apparatus that processes information and a server that exchanges information with the information processing apparatus, in which the information processing apparatus includes a settlement processing unit configured to perform processing relating to settlement of a commercial transaction to generate log information relating to the settlement, and a log information supplying unit configured to supply the log information relating to the settlement and generated by the settlement processing unit to the server without intervention of a commercial transaction processing unit that performs the processing relating to the commercial transaction, and the server includes an acquisition unit configured to acquire the log information relating to the settlement and supplied from the information processing apparatus, and a supplying unit configured to supply part or all of the log information relating to the settlement and acquired by the acquisition unit to a different information processing apparatus that is managed by a business operator different from a business operator that manages the server.

REFERENCE SIGNS LIST

100 Information processing system, 111 IC card, 114 Electronic money business operator server, 200 Information processing system, 300 Information processing system, 312 Commercial transaction terminal, 313 Commercial transaction server, 321 Multi reader-writer, 322 Commercial transaction processing unit, 330 Business log provision business operator, 331 Business log server, 351 Loop antenna, 352 Information processing unit, 361 RF (Radio Frequency) module, 362 SIM (Subscriber Identity Module), 363 Control unit, 364 Business log communication unit, 370 Global platform, 371 Client applet, 372 Electronic money A applet, 373 Electronic money B applet, 374 Electronic money C applet, 375 Electronic money D applet, 381 Settlement processing unit, 382 Business log provision unit, 401 CPU, 450 Settlement log, 451 User ID, 452 Timestamp, 453 Settlement money amount, 454 Process ID, 470 Commercial transaction log, 471 Commodity code, 472 Timestamp, 473 Settlement money amount, 474 Settlement type

The invention claimed is:

1. An information processing apparatus, comprising:
a structure including a global platform and a plurality of applications, wherein
the plurality of applications is executable on the global platform,
each of a set of applications of the plurality of applications is executable for a process related to a respective electronic money of a plurality of electronic moneys associated with an IC card,
at least one application of the plurality of applications is executable for communication with a server, and
the IC card is in a specific proximity to the information processing apparatus; and
circuitry configured to:
receive information associated with a selection of a first settlement service from a plurality of settlement services, wherein
the first settlement service of the plurality of settlement services corresponds to a first type of electronic money of the plurality of electronic moneys and a first application of the plurality of applications,
a second settlement service of the plurality of settlement services corresponds to a second type of electronic money of the plurality of electronic moneys and a second application of the plurality of applications, and the second application is independently executable from the first application;
perform, by execution of the first application of the plurality of applications associated with the first type of electronic money, settlement of a commercial transaction to generate log information, wherein
the generated log information is associated with the settlement of the commercial transaction,
the settlement is performed based on the selected first settlement service of the plurality of settlement services, and
the log information includes a time at which the settlement is performed;
receive a request from the server that is associated with a first business operator, wherein
the request is to supply the log information to the server; and
supply, by execution of the at least one application of the plurality of applications, the generated log information to the server based on the request, wherein
the information processing apparatus is associated with a second business operator different from the first business operator, and
the server performs provision of the log information.

2. The information processing apparatus according to claim 1, wherein the circuitry is further configured to:
perform short-range wireless communication with the IC card;
perform exchange of information with the IC card based on the short-range wireless communication; and
subtract an amount of money of the commercial transaction from the respective electronic money that corresponds to the selected first settlement service.

3. The information processing apparatus according to claim 1, wherein the log information further includes a settlement money amount that indicates a settled amount of money of the commercial transaction.

4. The information processing apparatus according to claim 3, wherein
the log information further includes user identification information and settlement identification information,
the user identification information corresponds to information of a user associated with the IC card, and
the settlement identification information corresponds to the settlement.

5. The information processing apparatus according to claim 3, wherein the circuitry is further configured to perform the commercial transaction.

6. The information processing apparatus according to claim 1, wherein the circuitry is further configured to:
perform communication with the server; and
supply the log information to the server based on the communication with the server.

7. An information processing method, comprising:
in an information processing apparatus that comprises circuitry and a structure that includes a global platform and a plurality of applications:
receiving, by the circuitry, information associated with a selection of a first settlement service from a plurality of settlement services, wherein
each of a set of applications of the plurality of applications is executable for a process related to a respective electronic money of a plurality of electronic moneys associated with an IC card,
at least one application of the plurality of applications is executable for communication with a server, the first settlement service of the plurality of settlement services corresponds to a first type of electronic money of the plurality of electronic moneys and a first application of the plurality of applications, a second settlement service of the plurality of settlement services corresponds to a second type of electronic money of the plurality of electronic moneys and a second application of the plurality of applications,
the second application is independently executable from the first application,
the IC card is in a specific proximity to the information processing apparatus, and
the plurality of applications is executable on the global platform;
performing, by execution of the first application of the plurality of applications associated with the first type of electronic money, settlement of a commercial transaction to generate log information, wherein
the generated log information is associated with the settlement of the commercial transaction,
the settlement is performed based on the selected first settlement service of the plurality of settlement services, and
the log information includes a time at which the settlement is performed;
receiving a request from the server that is associated with a first business operator, wherein
the request is to supply the log information to the server; and
supplying, by execution of the at least one application of the plurality of applications, the generated log information to the server based on the request, wherein
the information processing apparatus is associated with a second business operator different from the first business operator, and
the server performs provision of the log information.

8. An information processing system, comprising:
a first information processing apparatus; and
a server configured to communicate with the first information processing apparatus, wherein
the first information processing apparatus includes:
a structure including a global platform and a plurality of applications, wherein
the plurality of applications is executable on the global platform,
each of a set of applications of the plurality of applications is executable for a process related to a respective electronic money of a plurality of electronic moneys associated with an IC card,
at least one application of the plurality of applications is executable for communication with the server, and
the IC card is in a specific proximity to the first information processing apparatus; and
first circuitry configured to:
receive information associated with a selection of a first settlement service from a plurality of settlement services, wherein
the first settlement service of the plurality of settlement services corresponds to a first type of electronic money of the plurality of electronic moneys and a first application of the plurality of applications,
a second settlement service of the plurality of settlement services corresponds to a second type of electronic money of the plurality of electronic moneys and a second application of the plurality of applications, and
the second application is independently executable from the first application;
perform, by execution of the first application of the plurality of applications associated with the first type of electronic money, settlement of a commercial transaction to generate log information, wherein
the generated log information is associated with the settlement of the commercial transaction,
the settlement is performed based on the selected first settlement service of the plurality of settlement services, and
the log information includes a time at which the settlement is performed;
receive a request from the server that is associated with a first business operator, wherein
the request is to supply the log information to the server; and
supply, by execution of the at least one application of the plurality of applications, the generated log information to the server based on the request, wherein
the first information processing apparatus is associated with a second business operator different from the first business operator, and
the server includes second circuitry configured to:
acquire the log information from the first information processing apparatus; and
supply at least a part of the log information to a second information processing apparatus.

* * * * *